US010746660B2

United States Patent
Elmore et al.

(10) Patent No.: US 10,746,660 B2
(45) Date of Patent: Aug. 18, 2020

(54) CURE MONITORING SYSTEMS AND METHODS

(71) Applicant: 3M INNOVATIVE PROPERTIES COMPANY, St. Paul, MN (US)

(72) Inventors: Douglas L. Elmore, Plymouth, MN (US); Korbinian Gerlach, Gauting (DE); Gregory A. Kobussen, Woodbury, MN (US); Jack Wing Lai, Lake Elmo, MN (US); Joel D. Oxman, Minneapolis, MN (US); Rudolf Schmid, Eichenau (DE); Stefan K. Welker, Geltendorf (DE)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 16/319,384

(22) PCT Filed: Jul. 24, 2017

(86) PCT No.: PCT/IB2017/054475
§ 371 (c)(1),
(2) Date: Jan. 21, 2019

(87) PCT Pub. No.: WO2018/020398
PCT Pub. Date: Feb. 1, 2018

(65) Prior Publication Data
US 2019/0265167 A1 Aug. 29, 2019

Related U.S. Application Data

(60) Provisional application No. 62/368,348, filed on Jul. 29, 2016.

(51) Int. Cl.
*G01N 21/75* (2006.01)
*C08K 3/013* (2018.01)
(Continued)

(52) U.S. Cl.
CPC .......... *G01N 21/75* (2013.01); *A61C 19/004* (2013.01); *C08F 2/48* (2013.01); *C08J 3/24* (2013.01);
(Continued)

(58) Field of Classification Search
CPC .................................................. G01N 21/75
See application file for complete search history.

(56) References Cited

U.S. PATENT DOCUMENTS 7,250,611 B2   7/2007 Aguirre et al.
7,323,693 B2   1/2008 Sanuki et al.
(Continued)

FOREIGN PATENT DOCUMENTS

DE   102010061767   5/2012
JP   2002202294     7/2002
(Continued)

OTHER PUBLICATIONS

"ScanWave by Mini LED® User's Manual", May 2013, Satelec Acteon, Merignac France. JO5451, V5, 12 pages.
(Continued)

*Primary Examiner* — Larry W Thrower
(74) *Attorney, Agent, or Firm* — 3M Innovative Properties Company; Jonathan V. Sry

(57) ABSTRACT

Cure monitoring systems for and methods of monitoring polymerizable material to determine the degree of curing of the polymerizable material. A monitoring light source delivers visible monitoring light at one or more different visible wavelengths and a visible light detector detects the monitoring light diffusely reflected by the polymerizable material. The monitoring light has a wavelength of maximum emission ($\lambda$max-mon) that does not effectively induce polymerization of the polymerizable material. Change in intensity of the monitoring light reflected from the polymerizable material is used to determine when a selected degree of curing is reached in the polymerizable material.

22 Claims, 9 Drawing Sheets

(51) Int. Cl.
*A61C 13/15* (2006.01)
*C08F 2/48* (2006.01)
*C08J 3/24* (2006.01)
*G01N 21/47* (2006.01)
*G01N 21/84* (2006.01)
*G01N 21/17* (2006.01)

(52) U.S. Cl.
CPC ........... *C08K 3/013* (2018.01); *G01N 21/474* (2013.01); *G01N 21/4738* (2013.01); *G01N 21/84* (2013.01); *C08J 2300/10* (2013.01); *G01N 2021/1742* (2013.01); *G01N 2021/4735* (2013.01); *G01N 2021/4764* (2013.01); *G01N 2021/8411* (2013.01)

(56) References Cited

U.S. PATENT DOCUMENTS

| | | |
|---|---|---|
| 7,766,654 B2 | 8/2010 | Plank et al. |
| 8,189,189 B1 | 5/2012 | Herendeen |
| 9,161,828 B2 | 10/2015 | Senn et al. |
| 2003/0074095 A1 | 4/2003 | Neubauer et al. |
| 2004/0026005 A1 | 2/2004 | Kawai et al. |
| 2007/0259309 A1 | 11/2007 | West et al. |
| 2010/0003021 A1 | 1/2010 | Hirahara et al. |
| 2010/0140450 A1 | 6/2010 | Duret et al. |
| 2013/0306872 A1 | 11/2013 | Paulson |
| 2016/0074144 A1 | 3/2016 | Peterson |
| 2016/0114535 A1 | 4/2016 | Kritchman et al. |

FOREIGN PATENT DOCUMENTS

| | | |
|---|---|---|
| JP | 2003139697 | 5/2003 |
| JP | 2014149168 | 8/2014 |
| WO | 01/015497 | 3/2001 |
| WO | 01/086261 | 11/2001 |
| WO | 2015/173136 | 11/2015 |
| WO | 2018/020443 | 2/2018 |

OTHER PUBLICATIONS

International Search report for PCT International Application No. PCT/IB2017/054475 dated Dec. 26, 2017, 4 pages.
Supplementary European Search Report for EP 17 83 3670 dated Feb. 19, 2020.

CURE MONITORING SYSTEMS AND METHODS

CROSS REFERENCE TO RELATED APPLICATIONS

This application is a national stage filing under 35 U.S.C. 371 of PCT/IB2017/054475 filed Jul. 24, 2017, which claims the benefit of U.S. Provisional Application No. 62/368,348, filed Jul. 29, 2016, the disclosures of which are incorporated by reference in their entireties herein.

FIELD OF THE INVENTION

This invention relates generally to cure monitoring systems and methods of monitoring the curing of polymerizable material.

BACKGROUND

Selectively polymerizable materials are used in a variety of applications including, e.g., printing, coating, adhesives, and others, including in dentistry for, e.g., the restoration of teeth.

One challenge in the use of at least some polymerizable materials is determining when a polymerizable material has completed or is nearing completion of the curing process. In some instances in which a polymerizable material can be cured using electromagnetic radiation, time and electromagnetic radiation intensity may be used to gauge the curing process, with the assumption that exposure of the polymerizable material to electromagnetic radiation at a particular intensity in one or more wavelengths that causes the polymerizable material to cure and for a particular amount of time will result in an adequate degree of curing.

SUMMARY

Cure monitoring systems for and methods of monitoring polymerizable material to determine the degree of curing of the polymerizable material are described herein.

"Polymerizable materials" that may be monitored for curing using the systems and/or methods described herein may include any monomers, oligomers, and/or polymers and combinations thereof which are capable of participating in a polymerization reaction. Generally, such monomers, oligomers, and/or polymers will include at least one reactive chemical group which participates (e.g., is consumed) in the polymerization reaction. Examples of such reactive chemical groups include, but are not limited to: ethylenically unsaturated groups such as (meth)acrylate groups, vinyl groups (e.g., including styryl groups and other α-olefinic groups), and acrylamide groups; ring-openable groups such as oxirane (i.e., epoxide) groups and aziridine groups; condensation reactive groups, such as carboxylic acid groups (and derivatives thereof, including but not limited to, acid halides groups, ester groups, activated ester groups, lactone groups, etc.), amine groups, alcohol groups, and the like; and other reactive chemical groups such as isocyanates. Examples of polymerization reactions, include but are not limited to, step growth polymerization reactions (including condensation polymerization reactions), e.g., such as those used to form polyesters, polyamides, polyacetals, etc. and chain-growth (i.e., addition) polymerization reactions such (meth)acrylate and olefin polymerization reactions. Also included are those polymerizable materials which may be polymerized via hydrometallation (e.g., hydrosilylation), or other methods such as olefin metathesis (e.g., ring opening metathesis polymerization, "ROMP"). The polymerized material resulting from the polymerization reaction may be a homopolymer or a copolymer. The polymerized material resulting from the polymerization reaction may include crosslinks.

The polymerizable materials can cure/polymerize under a variety of one or more conditions such that the polymerizable materials undergo one or more physical and/or chemical changes (e.g., hardness, viscosity, opacity, shade/color, tackiness, modulus of elasticity, flexibility, reactive group (e.g., (meth)acrylate or oxirane) content, etc.).

The polymerizable material may include an initiator to facilitate the polymerization reaction. The identity of the initiator can and will vary depending on the particular components of the polymerizable material. For example, polymerizable materials may include photoinitiators (e.g., phosphine oxides, etc.), thermal initiators (e.g., peroxides, hydroperoxides, peracetates, azo compounds, etc.), and/or other initiators (e.g., a redox initiator system including an oxidizing agent and reducing agent, etc.) to facilitate a polymerization reaction. In (meth)acrylate based polymerizable materials, the initiator typically serves to provide a source of free radicals to initiate the polymerization. Depending on the particular type of initiator used, or combination of initiators used, the polymerization reaction may be initiated by electromagnetic radiation (e.g., actinic radiation), by heating, and/or chemically (e.g., by mixing of reducing agent and an oxidizing agent in a two-part system) to generate radical species. In the case of some epoxide-based polymerizable materials, various catalysts may be used to cure the epoxy (e.g., amines, acids, acid anhydrides, phenols, alcohols, thiols, etc.).

Examples of polymerizable materials in the form of polymerizable dental materials that may be monitored for curing using the systems and/or methods described herein include, but are not limited to: restoratives, composites (e.g., filling materials), adhesives, cements (e.g., resin modified glass ionomer cements, luting cements), sealants, primers, cavity liners, crown and bridge materials (either permanent or temporary), coatings, impression materials, and the like. It is understood that the term "polymerizable dental materials" further includes those polymerizable materials which may be used as part of orthodontic treatment, such as orthodontic primers, orthodontic adhesives, orthodontic cements, orthodontic sealants, or other polymerizable materials which may be used to bond an orthodontic appliance (e.g., brackets, bands, etc.) to a tooth.

The systems and/or methods described herein are configured to determine when a selected degree of curing of polymerizable material is reached using visible monitoring light. As used herein, "degree of curing" (and variations thereof) means the amount of change in one or more physical and/or chemical properties (e.g., hardness, viscosity, opacity, shade/color, tackiness, modulus of elasticity, flexibility, reactive group (e.g., (meth)acrylate or oxirane) content, etc.) of the polymerizable material as a result of curing. As described herein, the degree of curing of polymerizable material can be determined based on changes in the intensity of visible monitoring light that is reflected from the polymerizable material during and/or after curing.

As used herein, "diffuse reflectance" (and variations thereof) is used broadly to refer to collimated light reflected from the polymerizable material at angles of reflection that do not equal the angle of incidence of the curing light and non-collimated light not returned to the visible light detector at angles solely through specular reflectance from the surface of the polymerizable material. Monitoring light delivered to the polymerizable material may be diffusely reflected to the visible light detector in a system and/or method described herein after undergoing multiple scattering events within the polymerizable material, such that the reflected monitoring light interacts with numerous external and internal interfaces and regions of varying geometry, size, and complex refractive indices. In one or more embodiments, changes in the intensity of reflected monitoring light detected by the visible light detector before and after curing are not due to electronic, vibrational, or rotational resonance and a corresponding anomalous dispersion of the refractive index associated with a specific chemical functionality or moiety in any component of the polymerizable material (i.e., not an absorbing chromophore, such as C=C, epoxy, N—H, etc.).

The systems and methods described herein include a monitoring light source that delivers visible monitoring light at one or more different visible wavelengths and a visible light detector configured to detect the monitoring light diffusely reflected by the polymerizable material during a curing process. The monitoring light reflected from the polymerizable material during curing is used to determine when a selected degree of curing is reached in the polymerizable material. In one or more embodiments, the systems described herein may include a controller operably coupled to the visible light detector, with the controller being configured to determine when the polymerizable material reaches a selected degree of curing based at least in part on an output from the visible light detector. In one or more embodiments, the systems described herein may include a curing electromagnetic radiation source configured to emit curing electromagnetic radiation to cure the polymerizable material.

In one or more embodiments of the systems and/or methods described herein, the monitoring light source emits visible monitoring light (at, e.g., one or more wavelengths in a range from 400 nm to 800 nm) with one or more wavelengths of maximum emission, $\lambda_{max\text{-}mon}$, that do not effectively induce polymerization (curing) of the polymerizable material. As used herein, "not effectively inducing polymerization" means that the one or more monitoring wavelengths of maximum emission, $\lambda_{max\text{-}mon}$, of the monitoring light cause no appreciable change in the physical and/or chemical properties of the polymerizable material on which the monitoring light is incident for a period of 60 seconds or less as compared to the same polymerizable material under the same conditions that is not irradiated with the monitoring light.

In one or more embodiments of the systems and methods described herein, no wavelengths of light in the monitoring light emitted by the monitoring light source are absorbed by any polymerizable chemical moiety (e.g., an IR and/or near-IR absorbing chromophore, such as (meth)acrylate, epoxy, etc.) in the polymerizable material. In one or more alternative embodiments, any wavelengths of visible monitoring light that are detected and relied on to monitor the curing of any polymerizable material used in connection with the systems and/or methods as described herein are wavelengths that are not absorbed by any polymerizable chemical moiety in the polymerizable material. As a result, degree of curing of a polymerizable material using the visible monitoring light of one or more embodiments of the systems and/or methods described herein is not determined by detecting absorbance of one or more wavelengths of the visible monitoring light. Rather, the systems and/or methods described herein determine when polymerizable material reaches a selected degree of curing based on changes in the intensity of visible light reflected by the polymerizable material at one or more wavelengths.

Problems that may be addressed using the systems and methods described herein may include ensuring an adequate degree of curing. Determining the degree of curing may be particularly difficult in instances in which the polymerizable material is relatively thick (e.g., 1 mm or more, 2 mm or more, etc.) such as in, e.g., dental restorative materials located in tooth cavities, etc. To ensure an adequate degree of curing in, e.g., systems and methods used with polymerizable materials that cure through exposure to electromagnetic radiation or heat, the curing electromagnetic radiation and/or heat may, in some instances, be delivered for longer times and/or at higher intensities than required to reach that adequate degree of cure, resulting in slower processing and/or wasted energy. In still other instances, the polymerizable material may not be adequately cured if, for example, the curing electromagnetic radiation and/or heat is delivered for a shorter time and/or lower intensity than required. In yet other instances, the curing electromagnetic radiation and/or heat may be misdirected such that, although the curing electromagnetic radiation source may be activated for the required length of time, the intensity of the electromagnetic radiation that is actually incident on the polymerizable material is not sufficient for an adequate degree of curing.

In one or more embodiments, intensity of the reflected monitoring light changes as a function of the degree of curing due to the changing refractive index of polymerizable material as a function of level of cure. Monitoring the intensity of reflected visible monitoring light may be useful where, e.g., it is difficult or impossible to access the side of the polymerizable material opposite the surface on which the visible monitoring light is incident to measure transmittance of the monitoring light (e.g., dental composite material in a tooth, polymerizable materials located on opaque substrates, etc.).

In one or more embodiments, the systems and methods described herein may be capable of monitoring the degree of curing of polymerizable materials utilizing light scattering changes that occur during the curing or polymerization process, with the light scattering changes causing detectable changes in the intensity of the reflected monitoring light. For example, the monomers that undergo polymerization due to a change in chemical structure during the cure process may, in one or more embodiments, exhibit a change in refractive index. That change in refractive index may, in one or more embodiments, be directly correlated with the extent of polymerization of the reactive composition in the polymerizable material and, further, may be detectable using visible monitoring light due to changes in intensity of the reflected monitoring light as detected by a visible light detector as discussed herein.

In one or more embodiments, polymerizable materials that shift optical properties proportionally during the curing process may be combined with one or more materials (e.g., one or more fillers) that maintain a relatively constant refractive index. In such instances, the amount of light scattering may increase or decrease as a function of the increasing or decreasing change in of refractive index of the polymerizing matrix in the polymerizable material. Similarly, if during the curing process, phase separation occurs in polymerizable materials, then light scattering of the monitoring light may also change during the curing process—with the change in scattering resulting in a change in intensity of the reflected monitoring light as detected by a visible light detector.

One illustrative example of polymerizable materials that may be used with the systems and/or in the methods described herein are dental composites that are photopolymerized with, e.g., blue light in the range of approximately 400-500 nm. In one or more embodiments, the polymerizable dental composite material, which typically includes one or more fillers, would be probed or monitored for changes in scattering of the visible monitoring light as a function of curing time at a small and clinically relevant distance above the sample during the curing process.

The monitoring light sources used in the systems and/or methods described herein may, in one or more embodiments, deliver light at one or more wavelengths that are different and/or greater than wavelength(s) need to cure the polymerizable materials. There are several potential advantages for using monitoring light at different and/or longer wavelengths than the curing wavelengths.

One of the potential advantages is that the ability to detect light scatter at a wavelength different than incident curing wavelength may provide increased detection sensitivity. The ability to detect small changes in light scattering at the incident curing wavelengths may be challenging if, for example, the polymerizable material is light curable and the curing light is of a high intensity. In such circumstances, returning scattered monitoring light may be lost in the background noise of the incident curing light itself. Use of separate and distinct wavelength(s) for the monitoring light (along with a suitable detector) may enhance the detectability of small real time changes in scattering of the monitoring light. In one or more embodiments in which a curing light is blue light in the range of 400 nm-500 nm, a red light source (e.g., a laser or LED emitting light at approximately 650 nm) may, for example, be a useful monitoring light that is clear and distinct from the blue curing light.

A second potential advantage of using visible monitoring light at different wavelengths than the curing light wavelengths is visualization of the monitoring light. For example, monitoring light in the 600 nm-800 nm range can be easily visualized with the naked eye in the presence of a yellow/orange blue light filter that protects the eyes from glare caused by a blue curing light in the range of 400 nm-500 nm. The ability to see the monitoring light enables a user to see the location and placement of the curing electromagnetic radiation if, for example, the monitoring light is aligned with the curing electromagnetic radiation. In other words, the monitoring light may provide an aiming indicator to assist with accurate delivery of curing electromagnetic radiation to the polymerizable material to be cured. When used with polymerizable materials that are not cured through irradiation with one or more wavelengths of electromagnetic radiation (e.g., polymerizable materials that are cured by heating, mixing of a reducing agent and an oxidizing agent (in, e.g., a two-part system) to generate radical species, catalysts, etc.), visible monitoring light still provides a potential advantage because a user may be able to determine which portion/portions of the polymerizable material are being monitored for degree of curing using the visible monitoring light.

A third potential advantage for, e.g., polymerizable materials that absorb light at wavelengths in or near the range of any curing wavelengths, is that the monitoring light would not be absorbed, thus making it available for, e.g., reflectance measurements. For example, most polymerizable dental composite materials are intended to provide an aesthetic restoration with optical properties similar to tooth structure. As a consequence, polymerizable dental composite materials often include varying amounts of yellow and red colored fillers/material that absorb light at wavelengths between approximately 400-550 nm. A monitoring source delivering monitoring light at longer wavelengths (e.g., greater than about 550 nm) would not be absorbed or compromised by these pigment additives.

A fourth potential advantage is that using monitoring light at wavelengths that are, e.g., greater than the wavelengths initiating the curing process will not induce curing by the monitoring light. For example, dental composites that absorb light between 400-500 nm often include a photo-initiator that is typically a yellow compound that does not absorb light beyond about 500 nm. In such circumstances, visible monitoring light in the red to yellow portion of the visible light spectrum may be less likely to be absorbed and, therefore, available for reflection to visible light detector.

In one aspect, one or more embodiments of a system for monitoring a degree of curing of a polymerizable material as described herein may include: a monitoring light source that emits visible monitoring light at one or more wavelengths in a range from 400 nm to 800 nm, the monitoring light having a wavelength of maximum emission ($\lambda_{max-mon}$) that does not effectively induce polymerization of the polymerizable material; a visible light detector configured to detect the monitoring light at one or more wavelengths in a range from 400 nm to 800 nm after the monitoring light is diffusely reflected by the polymerizable material; and a controller operably coupled to the visible light detector, wherein the controller is configured to determine when the polymerizable material reaches a selected degree of curing based at least in part on a selected rate of change in intensity of the diffusely reflected monitoring light detected by the visible light detector.

In one or more embodiments of the systems described herein, the system further comprises a curing electromagnetic radiation source configured to emit curing electromagnetic radiation having a curing wavelength of maximum emission ($\lambda_{max-cure}$) at which curing of the polymerizable material is induced.

In one or more embodiments of the systems described herein, the controller is operably connected to the curing electromagnetic radiation source, and wherein the controller is configured to stop the curing electromagnetic radiation source from emitting the curing electromagnetic radiation after determining that the polymerizable material has reached the selected degree of curing.

In one or more embodiments of the systems described herein, the monitoring wavelength of maximum emission ($\lambda_{max-mon}$) is at least 50 nm different from the curing wavelength of maximum emission ($\lambda_{max-cure}$) of the curing electromagnetic radiation emitted by the curing electromagnetic radiation source.

In one or more embodiments of the systems described herein, the monitoring wavelength of maximum emission ($\lambda_{max-mon}$) is at least 100 nm different from the curing wavelength of maximum emission ($\lambda_{max-cure}$) of the curing electromagnetic radiation emitted by the curing electromagnetic radiation source.

In one or more embodiments of the systems described herein, the curing electromagnetic radiation comprises visible light at one or more wavelengths in a range from 400 nm to 800 nm.

In one or more embodiments of the systems described herein, the curing electromagnetic radiation comprises visible light at one or more wavelengths in a range from 400 nm to 500 nm.

In one or more embodiments of the systems described herein, the curing electromagnetic radiation comprises electromagnetic radiation in at least one of the infrared spectrum and the ultraviolet spectrum.

In one or more embodiments of the systems described herein, the visible monitoring light comprises visible light at one or more wavelengths in a range from 500 nm to 700 nm.

In one or more embodiments of the systems described herein, the curing electromagnetic radiation defines a curing wavelength half-max range having a full width at half maximum emission of the curing electromagnetic radiation of 100 nm or less.

In one or more embodiments of the systems described herein, the monitoring light defines a monitoring wavelength half-max range having a full width at half maximum emission of the monitoring light of 100 nm or less.

In one or more embodiments of the systems described herein, the monitoring light emitted by the monitoring light source has, at the curing wavelength of maximum emission ($\lambda_{max\text{-}cure}$), an intensity of 0.1 or less of an intensity of the curing electromagnetic radiation emitted by the curing electromagnetic radiation source at the curing wavelength of maximum emission ($\lambda_{max\text{-}cure}$).

In one or more embodiments of the systems described herein, the monitoring light source does not emit electromagnetic radiation at the curing wavelength of maximum emission ($\lambda_{max\text{-}cure}$).

In one or more embodiments of the systems described herein, the system further comprises a filter that transmits light having the monitoring wavelength of maximum emission ($\lambda_{max\text{-}mon}$) and does not transmit electromagnetic radiation having the curing wavelength of maximum emission ($\lambda_{max\text{-}cure}$), and wherein light and electromagnetic radiation directed at the visible light detector is incident on the filter before reaching the visible light detector.

In one or more embodiments of the systems described herein, the system comprises a filter configured to allow only electromagnetic radiation that does not effectively induce polymerization of the polymerizable material from reaching the visible light detector.

In one or more embodiments of the systems described herein, the visible light detector does not detect electromagnetic radiation having the curing wavelength of maximum emission ($\lambda_{max\text{-}cure}$).

In one or more embodiments of the systems described herein, the curing electromagnetic radiation source and the monitoring light source are coaxial.

In one or more embodiments of the systems described herein, the monitoring light source emits monitoring light having an intensity such that the monitoring light is visible to the naked human eye after passing through the polymerizable material.

In one or more embodiments of the systems described herein, the system comprises a mixing rod optically coupled to the curing electromagnetic radiation source and the monitoring light source, wherein the curing electromagnetic radiation and the monitoring light pass through the mixing rod before reaching the polymerizable material.

In one or more embodiments of the systems described herein, the visible light detector is optically coupled to the mixing rod, wherein the reflected monitoring light passes through the mixing rod before reaching the visible light detector.

In one or more embodiments of the systems described herein, the system further comprises a feedback generator operably coupled to the controller, wherein the controller is configured to cause the feedback generator to provide sensory feedback to a user after determining that the polymerizable material has reached the selected degree of curing.

In one or more embodiments of the systems described herein, the feedback generator comprises one or both of a visual indicator and an audible/tactile indicator.

In one or more embodiments of the systems described herein, the system comprises a hand-held device comprising a probe configured for insertion into the mouth of a human, and wherein the visible monitoring light is emitted from the probe, and further wherein monitoring light detected by the visible light detector is incident on the probe before reaching the visible light detector.

In one or more embodiments of the systems described herein, the system comprises a hand-held device comprising a probe configured for insertion into the mouth of a human, and wherein the visible monitoring light and the curing electromagnetic radiation are emitted from the probe, and further wherein monitoring light detected by the visible light detector is incident on the probe before reaching the visible light detector.

In a second aspect, one or more embodiments of the methods of monitoring a degree of cure of a polymerizable material as described herein may include: irradiating the polymerizable material with visible monitoring light at one or more wavelengths in a range from 400 nm to 800 nm, the monitoring light having a monitoring wavelength of maximum emission ($\lambda_{max\text{-}mon}$) that does not effectively induce polymerization of the polymerizable material; detecting the monitoring light after it has been diffusely reflected by the polymerizable material at one or more wavelengths in a range from 400 nm to 800 nm; and determining when the polymerizable material reaches a selected degree of curing based at least in part on a selected rate of change in intensity of the detected diffusely reflected monitoring light.

In one or more embodiments of the methods described herein, the method further comprises irradiating the polymerizable material with curing electromagnetic radiation, wherein the curing electromagnetic radiation has a curing wavelength of maximum emission ($\lambda_{max\text{-}cure}$) at which curing of the polymerizable material is induced.

In one or more embodiments of the methods described herein, the method further comprises stopping the irradiation of polymerizable material with the curing electromagnetic radiation after determining that the polymerizable material has reached the selected degree of curing.

In one or more embodiments of the methods described herein, the method further comprises: detecting the diffusely reflected monitoring light using a visible light detector; and stopping the irradiation of polymerizable material with the curing electromagnetic radiation based at least in part on an output from the visible light detector.

In one or more embodiments of the methods described herein, the output from the visible light detector is based at least in part on the selected rate of change in intensity of the diffusely reflected monitoring light as detected by the visible light detector.

In one or more embodiments of the methods described herein, the method further comprises providing sensory feedback to a user indicating that the polymerizable material has reached the selected degree of curing after determining that the polymerizable material has reached the selected degree of curing.

In one or more embodiments of the methods described herein, the sensory feedback comprises one or more of audible feedback, visual feedback, and tactile feedback.

In one or more embodiments of the methods described herein, the monitoring wavelength of maximum emission ($\lambda_{max\text{-}mon}$) is at least 50 nm different from the curing wavelength of maximum emission ($\lambda_{max\text{-}cure}$) of the curing electromagnetic radiation.

In one or more embodiments of the methods described herein, the monitoring wavelength of maximum emission ($\lambda_{max\text{-}mon}$) is at least 100 nm different from the curing wavelength of maximum emission ($\lambda_{max\text{-}cure}$) of the curing electromagnetic radiation.

In one or more embodiments of the methods described herein, the curing electromagnetic radiation comprises visible light at one or more wavelengths in a range from 400 nm to 800 nm.

In one or more embodiments of the methods described herein, the curing electromagnetic radiation comprises visible light at one or more wavelengths in a range from 400 nm to 500 nm.

In one or more embodiments of the methods described herein, the curing electromagnetic radiation comprises electromagnetic radiation in at least one of the infrared spectrum and the ultraviolet spectrum.

In one or more embodiments of the methods described herein, the visible monitoring light comprises visible light at one or more wavelengths in a range from 500 nm to 700 nm.

In one or more embodiments of the methods described herein, the curing electromagnetic radiation has a full width at half maximum emission of 100 nm or less.

In one or more embodiments of the methods described herein, the monitoring light has a full width at half maximum emission of 100 nm or less.

In one or more embodiments of the methods described herein, the curing electromagnetic radiation and the monitoring light irradiating the polymerizable material are coaxial.

In one or more embodiments of the methods described herein, the monitoring light irradiates a smaller area of a surface of the polymerizable material than the curing electromagnetic radiation.

In one or more embodiments of the methods described herein, a monitoring area on a surface of the polymerizable material irradiated by the monitoring light and a curing area on the surface of the polymerizable material irradiated by the curing electromagnetic radiation are the same.

In one or more embodiments of the methods described herein, the visible monitoring light irradiating the polymerizable dental material has an intensity, at the curing wavelength of maximum emission ($\lambda_{max\text{-}cure}$), of 0.1 or less of an intensity of the curing electromagnetic radiation at the curing wavelength of maximum emission ($\lambda_{max\text{-}cure}$).

In one or more embodiments of the methods described herein, the monitoring light does not include light at the curing wavelength of maximum emission ($\lambda_{max\text{-}cure}$).

In one or more embodiments of the methods described herein, the method further comprises filtering light reaching a visible light detector detecting the monitoring light after it has been diffusely reflected by the polymerizable material such that electromagnetic radiation having the curing wavelength of maximum emission ($\lambda_{max\text{-}cure}$) does not reach the visible light detector.

In one or more embodiments of the methods described herein, the method further comprises detecting the monitoring light after it has been diffusely reflected by the polymerizable material using a visible light detector that does not detect electromagnetic radiation having the curing wavelength of maximum emission ($\lambda_{max\text{-}cure}$).

In one or more embodiments of the methods described herein, the monitoring light penetrates through an entire thickness of the polymerizable material.

In one or more embodiments of the methods described herein, the monitoring light is visible to the naked human eye after passing through the polymerizable material.

In one or more embodiments of the methods described herein, the monitoring light passes through at least 4 mm of the polymerizable material.

In one or more embodiments of the methods described herein, the monitoring light passes through no more than 10 mm of the polymerizable material.

In one or more embodiments of the methods described herein, the visible monitoring light is emitted from a probe inserted into an oral cavity of a human, and further wherein monitoring light detected by the visible light detector is incident on the probe before reaching the visible light detector.

In one or more embodiments of the methods described herein, the visible monitoring light and the curing electromagnetic radiation are emitted from a probe inserted into an oral cavity of a human, and further wherein monitoring light detected by the visible light detector is incident on the probe before reaching the visible light detector.

In one or more embodiments of the methods described herein, the polymerizable material is a dental material.

In one or more embodiments of the methods described herein, the polymerizable material comprises at least one selected from the group of photoinitiators, thermal initiators, chemical initiators, and catalysts In one or more embodiments of the methods described herein, the polymerizable material comprises a filler.

In one or more embodiments of the methods described herein, the polymerizable material comprises a polymerizable chemical moiety, and wherein the polymerizable chemical moiety does not absorb the monitoring light.

The above summary is not intended to describe each embodiment or every implementation of the systems and methods described herein. Rather, a more complete understanding of the invention will become apparent and appreciated by reference to the following Detailed Description and claims in view of the accompanying figures of the drawing.

BRIEF DESCRIPTION OF THE DRAWING

The invention may be more completely understood and appreciated in consideration of the following detailed description of various embodiments of the invention in connection with the accompanying figures, in which.

DETAILED DESCRIPTION

Figure 1:
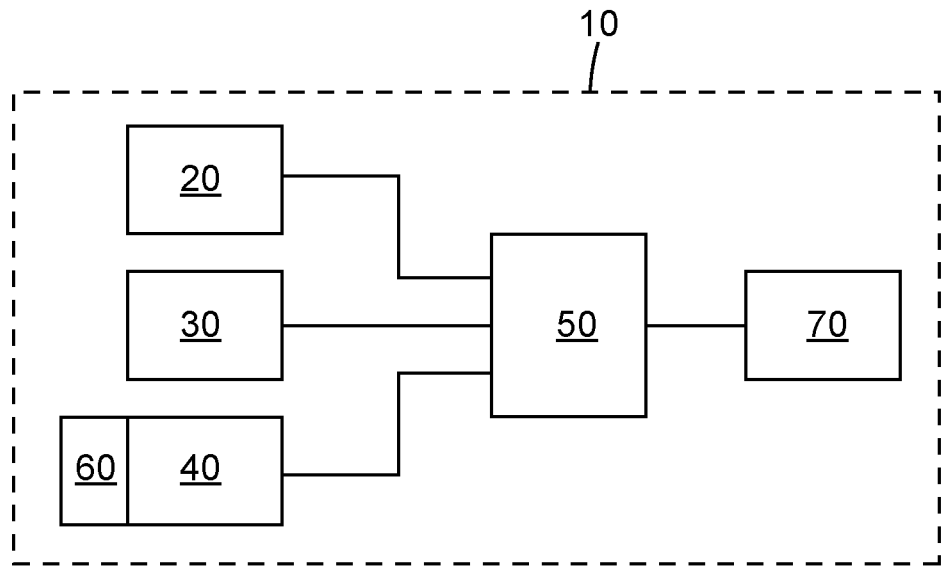
FIG. 1 is a schematic block diagram of one illustrative embodiment of a cure monitoring system as described herein.

In the following description, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a system for monitoring a degree of curing of a polymerizable material is depicted in FIG. 1. The depicted system 10 includes a curing electromagnetic radiation source 20, a monitoring light source 30, a visible light detector 40, and a controller 50 operably connected, in the depicted embodiment, to each of the curing electromagnetic radiation source 20, monitoring light source 30, and visible light detector 40. In one or more embodiments of the systems described herein, the curing electromagnetic radiation source 20 may be optional. The depicted system 10 also includes an optional filter 60 configured to control light/electromagnetic radiation allowed to reach the visible light detector 40. The controller 50 of the system 10 is also operably connected to an optional sensory feedback generator 70.

The curing electromagnetic radiation source 20 used in one or more embodiments of the systems described herein, may be configured to emit curing electromagnetic radiation having a curing wavelength of maximum emission, $\lambda_{max-cure}$, at which curing of selected polymerizable material is induced. In other words, the electromagnetic radiation emitted by the curing electromagnetic radiation source 20 initiates polymerization of the selected polymerizable material at its $\lambda_{max-cure}$. In one or more embodiments, polymerization initiation of the selected polymerizable material by the curing electromagnetic radiation may also occur at one or more wavelengths on one or both sides of the curing wavelength of maximum emission $\lambda_{max-cure}$. In one or more embodiments, the curing electromagnetic radiation source 20 may emit electromagnetic radiation within a relatively narrow range of wavelengths.

In one or more embodiments, the curing electromagnetic radiation emitted by the curing electromagnetic radiation source 20 may have a full width, in terms of wavelengths, at half maximum emission of, e.g., 100 nm or less, 50 nm or less, 20 nm or less, 10 nm or less, or even 1 nm or less (where half maximum emission is half of the intensity as measured at the curing wavelengths of maximum emission, $\lambda_{max-cure}$). That full width can be referred to as the curing wavelength half-max range. In other words, if the curing wavelengths of maximum emission ($\lambda_{max-cure}$, e.g., 450 nm) have a normalized intensity of one, the curing wavelength half-max range over which the curing electromagnetic radiation source emits electromagnetic radiation with a normalized intensity of 0.5 or more occupies a range of 100 nm or less (or 50 nm or less, 20 nm or less, 10 nm or less, or even 1 nm or less) which contains the curing wavelengths of maximum emission ($\lambda_{max-cure}$), In such embodiments, the curing wavelengths of maximum emission ($\lambda_{max-cure}$) may or may not be centered within the curing wavelength half-max range. Further, the curing electromagnetic radiation may fall below an intensity of 0.5 within the curing wavelength half-max range so long as the widest range of wavelengths of the curing electromagnetic radiation has, at its outermost wavelengths, an intensity that is half of the intensity of the curing electromagnetic radiation at $\lambda_{max-cure}$. In other words, an intensity curve of the curing electromagnetic radiation may contain one or more local minimums within the curing wavelength half-max range.

In one or more embodiments, the curing electromagnetic radiation source 20 may be a visible light source that emits visible light at one or more wavelengths ranging from 400 nm to 800 nm. In one or more embodiments, the curing electromagnetic radiation source 20 may emit visible light in a narrower range. For example, in one or more embodiments, the curing electromagnetic radiation source 20 used in systems and/or methods described herein may emit visible light at one or more wavelengths ranging from, e.g., 400 nm to, e.g., 500 nm.

In one or more alternative embodiments of the systems and methods described herein, the curing electromagnetic radiation may include electromagnetic radiation in one or both of the infrared spectrum and the ultraviolet spectrum.

The curing electromagnetic radiation source 20 used in one or more embodiments of the systems and methods described herein can take any suitable form. Some potentially suitable curing electromagnetic radiation sources may include, e.g., halogen lamps, xenon lamps, arc lamps, LED's, LED emitters, LED dies, metal halide lamps, mercury vapor lamps, sodium lamps, lasers, etc. Delivery of the electromagnetic radiation emitted by the curing electromagnetic radiation source 20 to the polymerizable material may be accomplished using any suitable manner, e.g., light guides, wave guides, fiber optics, lenses, etc.

In one or more embodiments of the systems and/or methods described herein, the monitoring light source 30 may emit visible monitoring light at the polymerizable material at one or more wavelengths in a range from, e.g., 400 nm to, e.g., 800 nm. The monitoring light may, in one or more embodiments, have a monitoring wavelength of maximum emission, $\lambda_{max\text{-}mon}$, that is different from the curing wavelength of maximum emission ($\lambda_{max\text{-}cure}$) of the curing electromagnetic radiation.

The monitoring light emitted by a monitoring light source in one or more embodiments of the systems and/or methods that include a curing electromagnetic radiation source as described herein may, at the curing wavelength of maximum emission ($\lambda_{max\text{-}cure}$), have an intensity of 0.1 or less of an intensity of the curing light emitted by the curing electromagnetic radiation source at the curing wavelength of maximum emission, $\lambda_{max\text{-}cure}$. In one or more alternative embodiments, the monitoring light source does not emit light at the curing wavelength of maximum emission, $\lambda_{max\text{-}cure}$.

In one or more embodiments, the monitoring wavelength of maximum emission may be at least 50 nm different from the curing wavelength of maximum emission of any curing electromagnetic radiation. In still one or more alternative embodiments, the monitoring light source 30 may emit visible monitoring light with a monitoring wavelength of maximum emission that is at least 100 nm different from the curing wavelength of maximum emission of the curing electromagnetic radiation. In other words, if the curing wavelength of maximum emission is at 450 nm, the monitoring wavelength of maximum emission may, in one or more embodiments, be 500 nm or more for a 50 nm difference or 550 nm or more for a 100 nm difference.

n one or more embodiments, the monitoring light source 30 may emit visible light within a relatively narrow range of wavelengths. In one or more embodiments, the monitoring light emitted by the monitoring light source 30 may have a full width, in terms of wavelengths, at half maximum emission of, e.g., 100 nm or less, 50 nm or less, 20 nm or less, 10 nm or less, or even 1 nm or less (where half maximum emission is half of the intensity of any monitoring wavelengths of maximum emission, $\lambda_{max\text{-}mon}$). That full width can be referred to as the monitoring wavelength half-max range. In other words, if the monitoring wavelengths of maximum emission ($\lambda_{max\text{-}mon}$, e.g., 650 nm) have a normalized intensity of one, the monitoring wavelength half-max range over which the monitoring light source emits light with a normalized intensity of 0.5 or more occupies a range of 100 nm or less (or 50 nm or less, 20 nm or less, 10 nm or less, or even 1 nm or less) which contains the monitoring wavelengths of maximum emission ($\lambda_{max\text{-}mon}$). In such embodiments, the monitoring wavelengths of maximum emission ($\lambda_{max\text{-}mon}$) may or may not be centered within the monitoring wavelength half-max range. Further, the monitoring light may fall below an intensity of 0.5 within the monitoring wavelength half-max range so long as the widest range of wavelengths of the monitoring light has, at its outermost wavelengths, an intensity that is half of the intensity of the monitoring light at $\lambda_{max\text{-}mon}$. In other words, an intensity curve of the monitoring light may contain one or more local minimums within the monitoring wavelength half-max range.

In one or more embodiments of the systems and methods described herein, any wavelengths of maximum emission $\lambda_{max\text{-}cure}$, of the curing electromagnetic radiation are not contained within the monitoring wavelength half-max range.

The monitoring light source 30 used in one or more embodiments of the systems and methods described herein can take any suitable form. Some potentially suitable visible monitoring light sources may include, e.g., halogen lamps, xenon lamps, arc lamps, LED's, LED emitters, LED dies, metal halide lamps, mercury vapor lamps, sodium lamps, lasers, etc. and associated components such as, e.g., filters, etc. needed to control the wavelengths of light delivered to the polymerizable material by the monitoring light source 30. Delivery of the monitoring light emitted by the monitoring light source 30 to the polymerizable material may be accomplished using any suitable manner, e.g., light guides, wave guides, fiber optics, lenses, etc.

In one or more embodiments, the monitoring light source emits monitoring light with sufficient intensity (e.g., 1 mW, etc.) to penetrate the entire thickness of the polymerizable material being monitored for curing. If the monitoring light cannot penetrate the entire thickness of the polymerizable material, then an accurate determination of the degree of curing of the full thickness of the polymerizable material may not be obtained using the systems and methods described herein. As discussed herein, a variety of potential light sources may be suitable, however, the use of collimated and/or coherent light sources such as, e.g., lasers, laser LEDs, etc. may provide monitoring light that has intensities capable of providing the most desirable outcomes.

In one or more embodiments of the systems and/or methods described herein, the monitoring light source may emit monitoring light having an intensity such that the monitoring light is visible to the naked human eye after passing through the polymerizable material. In other words, in a system and/or method in which the visible monitoring light is incident on a first surface of the polymerizable material, that visible monitoring light may be seen in an unlit darkroom by the naked human eye on a surface of the polymerizable material located on an opposite side of the polymerizable material after having passed through the thickness of the polymerizable material.

In one or more embodiments, the intensity of the monitoring light may be sufficient to pass through at least 4 mm of the polymerizable material being monitored (where, for example, the polymerizable material is a dental polymerizable material used for tooth restoration and/or formation). In one or more alternative embodiments, the intensity of the monitoring light may be sufficient to pass through at least 4.5 mm, 5 mm, 6 mm, or 7 mm of the polymerizable material being monitored (where, for example, the polymerizable material is a dental polymerizable material used for tooth restoration and/or formation).

The intensity of the monitoring light may also, in one or more embodiments be controlled such that it does not exceed a selected limit. Limiting intensity of the monitoring light may be useful where monitoring light intensity above certain limits may adversely affect tissue in, e.g., the oral cavity and/or present other safety considerations. For example, in one or more embodiments, the intensity of the monitoring light may be sufficient to pass through no more than 10 mm of the polymerizable material being monitored (where, for example, the polymerizable material is a dental polymerizable material used for tooth restoration/formation). In one or more alternative embodiments, the intensity of the monitoring light may be sufficient to pass through no more than 9 mm, 8 mm, 7 mm, 6 mm, or 5 mm of the polymerizable material being monitored (where, for example, the polymerizable material is a dental polymerizable material used for tooth restoration/formation).

Figure 5:
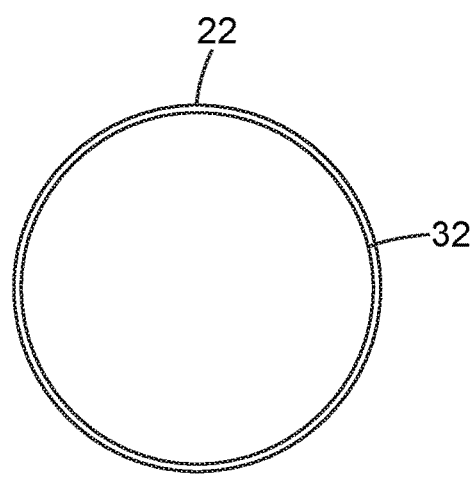
FIG. 5 depicts one illustrative embodiment of a handheld cure monitoring system as described herein.

In one or more embodiments of the systems described herein that include both a curing electromagnetic radiation source and a monitoring light source, the two sources may emit light or electromagnetic radiation along the same propagation axis (see, e.g., propagation axis 111 in FIG. 5). In one or more alternative embodiments, the curing electromagnetic radiation source and the monitoring light source may emit along two different propagation axes. In one or more embodiments, those propagation axes for the curing electromagnetic radiation and the monitoring light may converge at a selected distance from the curing electromagnetic radiation source and the monitoring light source.

As discussed herein, the visible monitoring light may, in one or more embodiments, provide a visual aid to a user delivering curing electromagnetic radiation to a polymerizable material to assist with proper curing. In one or more embodiments of the systems and methods described herein, the visible monitoring light delivered by a monitoring light source may be collimated or otherwise controlled/focused to provide coverage, on a surface of the polymerizable material, over a selected monitoring area relative to the curing area to which the curing electromagnetic radiation is delivered.

Figure 2:
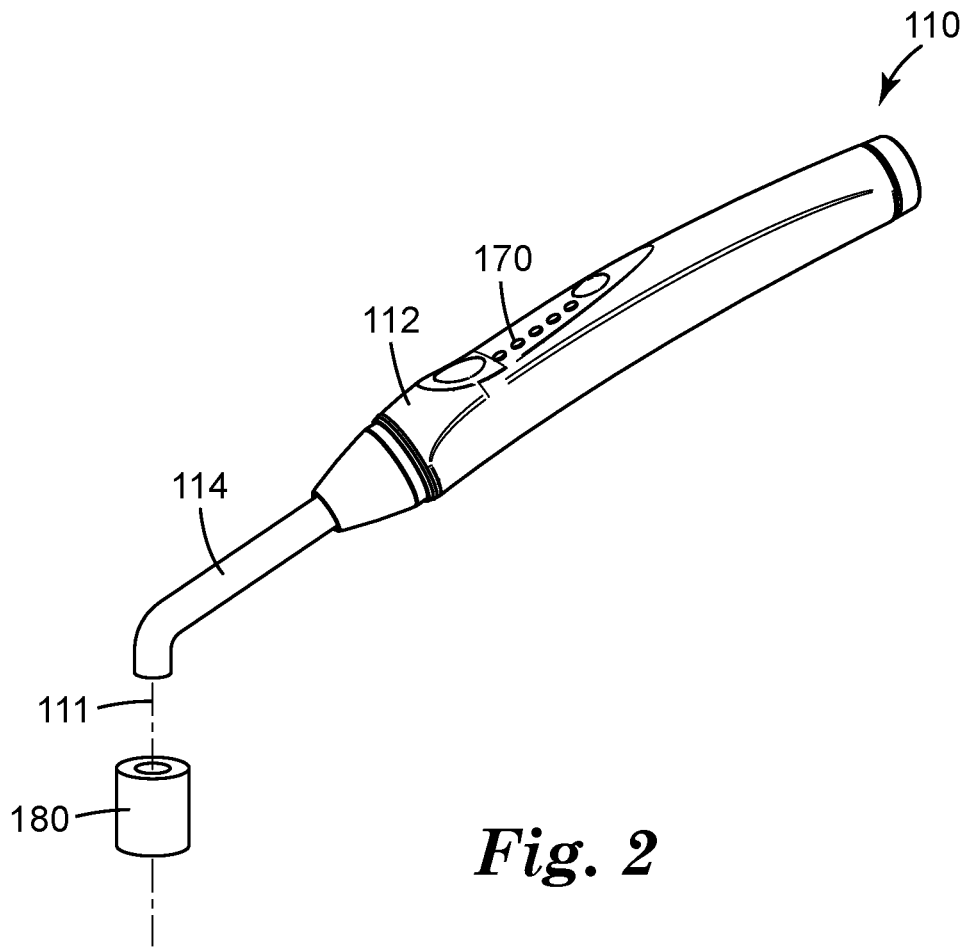
FIG. 2 depicts one illustrative embodiment of the relative areas on which the curing electromagnetic radiation and visible monitoring light are incident on a surface.
Figure 3:
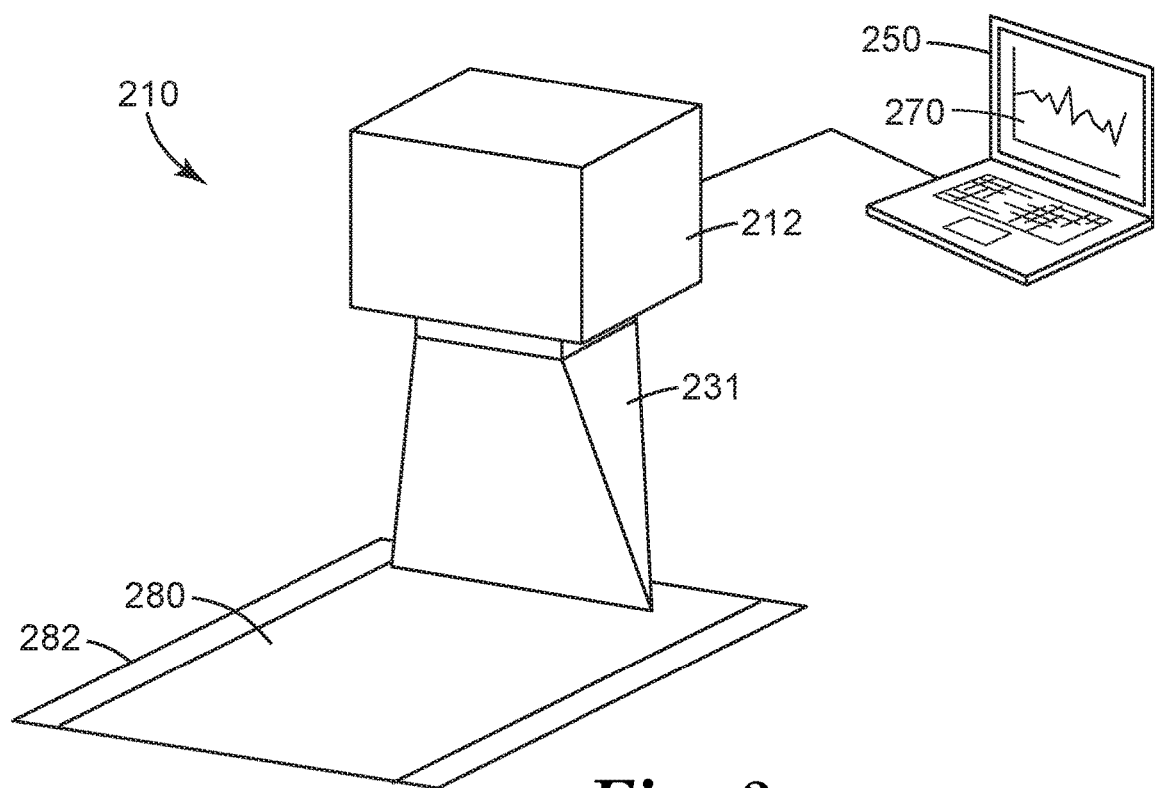
FIG. 3 depicts another illustrative embodiment of the relative areas on which the curing electromagnetic radiation and visible monitoring light are incident on a surface.

FIGS. 2 and 3 depict two examples of the many possible relationships between monitoring area and the curing area on the surface of the polymerizable material over which monitoring light and/or curing electromagnetic radiation may be delivered in one or more embodiments of the systems and methods described herein. As seen in, e.g., FIG. 2, the monitoring light may be focused to a monitoring area 32 that is smaller than the curing area 22 over which the curing electromagnetic radiation is delivered while FIG. 3 depicts an arrangement in which the monitoring light is delivered to a monitoring area 32 that is the same as the curing area 22 on which the curing electromagnetic radiation is incident (where "the same" means that the monitoring area and the curing area differ from each other by no more than 5%). The size of the monitoring area 32 occupied by the monitoring light relative to the curing area 22 defined by the curing electromagnetic radiation may, in one or more embodiments, be selectively adjustable by, e.g., focusing, defocusing, collimating, de-collimating, etc.

In one or more embodiments of the systems described herein, the visible light detector 40 may be configured to detect monitoring light emitted by the monitoring light source. In one or more embodiments, that reflected monitoring light may be diffusely reflected from the polymerizable material and, as described herein, its detection may allow for monitoring a degree of curing of the polymerizable material by, e.g., curing electromagnetic radiation. In one or more embodiments, the monitoring light diffusely reflected by the polymerizable material may be detected by the visible light detector 40 while the curing electromagnetic radiation is incident on the polymerizable material. In one or more embodiments, the visible light detector 40 may be configured to detect light in a range from 400 nm to 800 nm.

To limit issues that may be associated with detection of the curing electromagnetic radiation by the visible light detector, in one or more embodiments the visible light detector may be in the form of a detector that does not detect electromagnetic radiation having the curing wavelengths of maximum emission, $\lambda_{max\text{-}cure}$. In one or more alternative embodiments, the visible light detectors used in the systems and/or methods described herein may not detect electromagnetic radiation falling within a curing wavelength half-max range as defined herein.

In place of and/or in addition to using visible light detectors that do not detect curing electromagnetic radiation to detect the reflected monitoring light, one or more embodiments of the systems and/or methods described herein may include one or more filters (see, e.g., filter 60 in FIG. 1) to filter light and/or electromagnetic radiation allowed to reach the visible light detectors. In one or more embodiments, the filter 60 may not allow electromagnetic radiation having any curing wavelengths of maximum emission, $\lambda_{max\text{-}cure}$, to pass through to reach the visible light detector 40. In one or more alternative embodiments, the filter 60 may not allow electromagnetic radiation falling within the curing wavelength half-max range as defined herein to pass through to reach the visible light detector. In one or more alternative embodiments, the filters or filtering used in the systems and/or methods described herein may allow only light that does not effectively induce polymerization of the polymerizable material to reach the visible light detector.

In one or more embodiments, the light detector 40 and/or filter 60 may be configured to detect at least light having the monitoring wavelengths of maximum emission, $\lambda_{max\text{-}mon}$. In other words, the light detector 40 and/or filter 60 may be matched with the monitoring light source 30 such that at least the monitoring wavelengths of maximum emission, $\lambda_{max\text{-}mon}$ are detected by the light detector.

The monitoring light reflected from the polymerizable material can be measured by any suitable visible light detector technology. For example, any type of solid state sensing device such as, e.g., photodiodes, photo-detectors, phototransistors, analog light sensors, digital light sensors, frequency light sensors, etc. may be used. The visible light detectors used in one or more embodiments of the systems and methods described herein may generate a signal (for use by, e.g., a controller 50) that is proportional to the intensity of reflected light received from the polymerizable material. Collection and delivery of the reflected monitoring light to the visible light detectors used in the systems and methods described herein may be accomplished using any one or more refractive and/or reflective optical devices, e.g., lenses, mirrors, light guides, wave guides, fiber optics, etc.

In one or more embodiments, the visible monitoring light source 30 and the visible light detector 40 may be combined in one device such as, e.g., an LED driven in a pulsed mode in which an LED functions as a light source when driven and operates as a light detector when operated under currentless conditions.

In the illustrative embodiment depicted in FIG. 1, the system 10 includes a controller 50 that is operably connected to the curing electromagnetic radiation source 20, the monitoring light source 30, and the visible light detector 40. The controller 50 may also, in one or more embodiments, be operably connected to a sensory feedback generator 70 configured to generate feedback that can be sensed by a user of the systems and/or methods described herein. In one or more embodiments, the sensory feedback generators may be in the form of, e.g., one or more visual indicators and/or one or more audible/tactile indicators as discussed in connection with the illustrative systems depicted in FIGS. 5 and 6.

Figure 4:
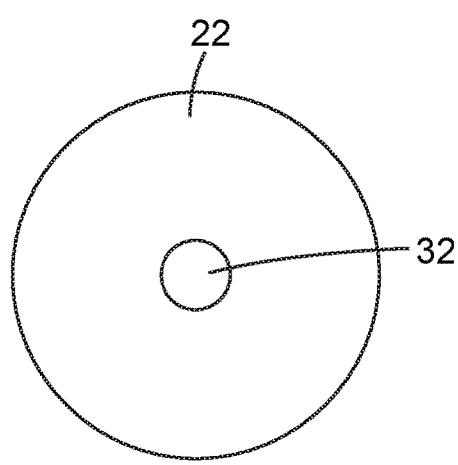
FIG. 4 depicts one illustrative example of the degree of cure for a selected polymerizable material and time along the x-axis and diffuse reflectance along the y-axis.

In one or more embodiments in which the controller 50 is operably coupled to the visible light detector 40, the controller 50 may be configured to determine when polymerizable material being monitored using monitoring light emitted by the monitoring light source 30 reaches a selected degree of curing based at least in part on a selected rate of change in the intensity of diffusely reflected monitoring light detected by the visible light detector 40. In one or more embodiments, the selected rate of change in intensity of the diffusely reflected monitoring light detected by the visible light detector will decrease as the degree of curing of polymerizable material increases. In other words, the rate of change in the intensity of the diffusely reflected monitoring light from adequately cured polymerizable material will be significantly lower than the rate of change in the intensity of the diffusely reflected monitoring light as seen at the start of a curing process when little to none of the polymerizable material is cured. One example illustrating degree of cure and time along the x-axis and diffuse reflectance along the y-axis is depicted in FIG. 4 as line 26 with point 28 positioned at a location at which the rate of change in intensity of the diffusely reflected monitoring light reaches a selected rate of change that can be correlated to a selected degree of curing of a selected polymerizable material as discussed herein.

In one or more embodiments in which the controller 50 is operably connected to the curing electromagnetic radiation source 20 and the visible light detector 40, the controller may be configured to stop the curing electromagnetic radiation source 20 from emitting curing electromagnetic radiation after based at least in part on an output from the visible light detector 40. That output from the visible light detector 40 may, in one or more embodiments, involve using a controller 50 that is configured to determine that the polymerizable material has reached the selected degree of curing as correlated to the selected rate of change in intensity of the diffusely reflected monitoring light. In such a situation, for example, the visible light detector 40 may output a signal to the controller 50 that is indicative of the intensity of the diffusely reflected monitoring light. Further, that signal from the visible light detector 40 changes as the intensity of the diffusely reflected monitoring light changes to provide data for the controller 50 to determine a rate of change in intensity of the diffusely reflected monitoring light which, as discussed herein, can be correlated to a selected degree of curing of the polymerizable material.

As discussed herein, one or more embodiments of the systems described herein may include a sensory feedback generator in the form of a visual indicator operably connected to the controller, with the controller configured to use the visual indicator to provide sensory feedback in the form of a visible indicator to a user of the system. In one or more embodiments, the visual indicator may be in the form of a light that, under control of the controller 50, does one or more of the following: turns on or off, flashes, changes color, changes intensity, etc. to provide a visible indication that the selected degree of curing of the polymerizable material has been reached. In one or more alternative embodiments, the sensory feedback generator in the form of a visual indicator could be provided in the form of a visual indicator on a display device (e.g., one or more lights, icons, etc. on a graphical user interface (GUI), etc. found on, e.g., a screen of an LCD or other display) that is operably connected to the controller 50.

Other sensory feedback generators which may be operably connected to the controller 50 in one or more embodiments of the systems described herein may be used to provide sensory feedback other than visual feedback to a user of the system. The sensory feedback generators may, in one or more embodiments, be in the form or a speaker, buzzer, siren, etc. typically used to generate vibrations that are audible by the human ear. In one or more alternative embodiments, the sensory feedback generators may generate vibrations that are normally sensed tactilely by a human user (for example, a person holding a dental curing light).

In one or more embodiments, the controller 50 may be configured to use the sensory feedback generators to provide an indication to a user that a curing or polymerization process is not progressing or progressing slower than required and/or preferred. In such situations, one or more of the sensory feedback generators may be used to provide sensory feedback that is different from that provided in situations where polymerization of the polymerizable material is progressing as expected and/or desired. In such systems and/or methods, the user may then have an opportunity to correct the curing process, stop the curing process, etc.

In place of or in addition to the use of filtering and/or visible light detectors that do not detect electromagnetic radiation of a curing wavelength of maximum emission as described herein, one or more embodiments of the systems and/or methods described herein may use strobing of the monitoring light and/or any curing electromagnetic radiation. For example, the controller may, in one or more embodiments, cycle the monitoring light source on and off and detect reflected monitoring light only during the appropriate intervals. In one alternative, a curing electromagnetic radiation source may be cycled on and off with the visible light detector used to detected reflected light only when the curing electromagnetic radiation is not emitted. In still other systems and/or methods, both the monitoring light source and the curing electromagnetic radiation source may be strobed such that when one source is emitting light/electromagnetic radiation the other source is not. In strobed systems and/or methods, filtering of the light/electromagnetic radiation reaching the detector may not be needed.

The controllers used in the systems described herein may be provided in any suitable form and may, for example, include a processing unit and optionally memory. In one or more embodiments, the processing unit of a controller may, for example, be in the form of one or more microprocessors, Field-Programmable Gate Arrays (FPGA), Digital Signal Processors (DSP), microcontrollers, Application Specific Integrated Circuit (ASIC) state machines, computing devices, etc. that may be integrated in a single piece of hardware or distributed in multiple pieces of hardware that can operatively communicate with one another.

The systems as described herein may, in one or more embodiments, include a monitoring light source that emits visible monitoring light, a visible light detector configured to detect the monitoring light reflected by polymerizable material, and one or both of a curing electromagnetic radiation source configured to emit curing electromagnetic radiation and a controller operably coupled to the visible light detector and, optionally, the curing electromagnetic radiation source. These various components may be incorporated into a variety of devices. In one or more embodiments, the monitoring light source and a visible light detector configured to detect the monitoring light reflected by polymerizable material may be incorporated into a unitary structure such as, e.g., a probe used in, for example, a dental curing light. In one or more embodiments, any such probe may also include components designed to deliver curing electromagnetic radiation from a curing electromagnetic radiation source that may also form a part of the same system.

Figure 6:
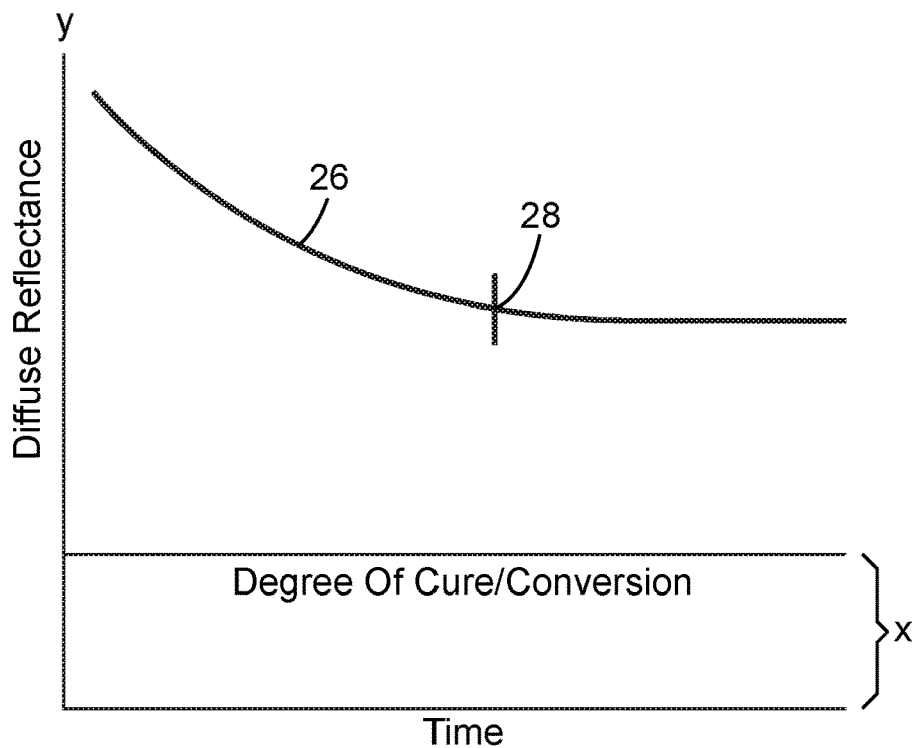
FIG. 6 depicts one illustrative embodiment of another cure monitoring system as described herein.

The form of the systems described herein and/or used in the methods described herein may change based on the form of the polymerizable material to be monitored using visible light as discussed herein. For example, in one or more embodiments the polymerizable material may be in the form of a discrete mass such as, e.g., dental restorative material. In one or more alternative embodiments, the polymerizable material may be in the form of, e.g., a coating, layer, film, etc. Two illustrative examples of systems for monitoring the curing of polymerizable material are depicted in FIGS. 5 and 6.

The illustrative system 110 of FIG. 5 includes a housing 112 that may contain, in one or more embodiments, an optional curing light source, monitoring light source, visible light detector, and controller in a handheld device that may be suitable for, e.g., curing and monitoring the degree of curing of polymerizable materials used for, e.g., dental restoration, etc. Although not depicted, the system 110 may include a power supply operably connected to any of the components requiring power (the power source may, in one or more embodiments, located in the housing 112).

The system 110 depicted in FIG. 5 also includes a probe 114 that may, in one or more embodiments, incorporate one or more light guides used to direct and deliver curing electromagnetic radiation (if any) and visible monitoring light to selected polymerizable material 180. In one or more embodiments, the curing electromagnetic radiation and/or the monitoring light may be delivered to the polymerizable material 180 along propagation axis 111. The probe 114 may also include a light guide configured to collect reflected monitoring light and deliver it to a visible light detector of the system 110 (which may, for example, be located in the housing 112). In one or more alternative embodiments, the probe 114 may itself carry one or more of the components such as the curing electromagnetic radiation source, monitoring light source and/or visible light detector. In one or more embodiments, the probe 114 may be sized for placement in the oral cavity of a subject to, e.g., cure polymerizable dental material in vivo.

The illustrative system 110 may include one or more sensory feedback generators to provide feedback that can be sensed by a user of the system 10. In the depicted embodiment, the sensory feedback generators may include one or more visual indicators 170 and/or one or more audible/tactile indicators (e.g., speakers, vibration units, etc.—not depicted in FIG. 5). In one or more embodiments, the sensory feedback is delivered to be sensed by a user to provide an indication regarding the degree of curing of polymerizable material and/or if a selected degree of curing of the polymerizable material has been reached.

FIG. 6 depicts another illustrative embodiment of a system for monitoring curing of a polymerizable material as described herein. In one or more embodiments, the curing system may be similar to those described in, e.g., U.S. Pat. No. 7,250,611 (Aguirre et al.). The depicted monitoring system 210 may be in the form of, e.g., a station located above a substrate 282 on which polymerizable material 280 is located (e.g., a process in which the substrate is a moving web used in adhesive, tape, or web-based manufacturing). The substrate 282 can be disposed on a platform, such as a moving platform or conveyor belt, or substrate 282 can be suspended between moving rollers (not shown), to provide for sheet or continual curing of large quantities of material.

The housing 212 of the system 210 may include one or more monitoring light sources along with any required optical components needed to direct the visible monitoring light 231 those sources emit onto the polymerizable material 280. The housing 212 may also contain or carry one or more visible light detectors configured to detect visible monitoring light reflected from the polymerizable material as discussed herein.

In one or more embodiments, the housing 212 may also include one or more curing electromagnetic radiation sources and the optical components used to deliver the curing electromagnetic radiation to the polymerizable material. The curing electromagnetic radiation sources and the optical components used to deliver the curing electromagnetic radiation may, in one or more embodiments, commingle the curing electromagnetic radiation with the visible monitoring light such that any surface on which the visible monitoring light is incident also receives the curing electromagnetic radiation. In such a system, visual monitoring of the delivery of the curing electromagnetic radiation may be possible regardless of whether or not the curing electromagnetic radiation is, itself, visible.

In addition, system 210 also includes a controller 250 that may be operably coupled to, e.g., any visible monitoring light sources, visible light detectors, and curing electromagnetic radiation sources in the housing 212. The controller may include, in one or more embodiments, a sensory feedback generator in the form of, e.g., a display 270 that may be used to provide sensory feedback to a user regarding the curing of the polymerizable material as determined by the system 210.

Figure 7:
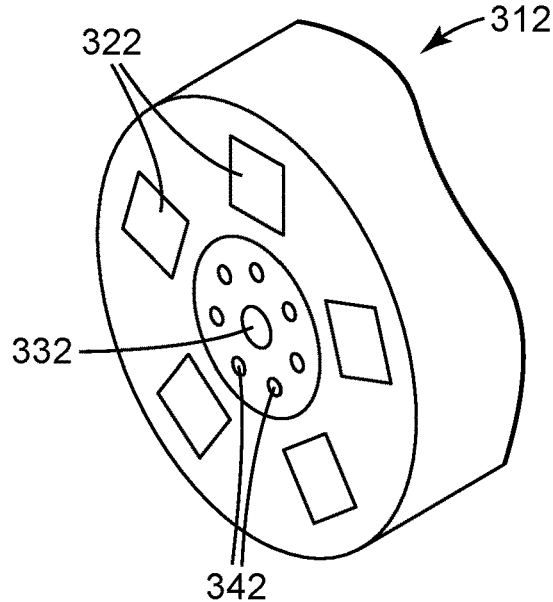
FIG. 7 depicts one illustrative arrangement of structures for delivering curing electromagnetic radiation and visible monitoring light to polymerizable material, and for delivering reflected monitoring light to a detector in one illustrative embodiment of a cure monitoring system as described herein.

One illustrative embodiment of a probe 312 that may be used in one or more embodiments of a system as described herein is depicted in FIG. 7. The depicted embodiment of probe 312 may include an optical transmitter (e.g., an optical mixing rod, total internally reflective (TIR) light guide, etc.) that is optically coupled to LEDs 322 that serve as curing electromagnetic radiation sources configured to emit curing electromagnetic radiation for selected polymerizable material as discussed herein. It should be understood that the depicted LEDs 322 are arranged in one selected array, but that many more arrays could be used for arranging multiple curing electromagnetic radiation sources on a probe of a system as described herein. Furthermore, although five LEDs 322 are depicted in FIG. 7, one or more alternative embodiments of systems described herein may include as few as one curing electromagnetic radiation source or any other selected number of curing electromagnetic radiation sources as needed to provide curing electromagnetic radiation over a desired area and at desired intensities needed to polymerize the selected polymerizable material.

Probe 312 also includes the distal end of a visible monitoring light source transmitter 342 that is configured to emit visible monitoring light produced by a visible monitoring light source which may be located in, for example, a housing to which the probe 312 is attached. The transmitter 342 may take a variety of different forms as described herein such as, e.g., a fiber-optic cable, a fiber-optic cable bundle, light guide, etc. further, the transmitter 342 may include a lens at its distal end to control dispersion of the visible monitoring light. Further, although only one visible light source transmitter 342 is depicted in the illustrative embodiment of FIG. 7, it should be understood that one or more alternative embodiments of a probe 312 used in a system as described herein may include two or more visible monitoring light source transmitters arranged in any suitable format. Furthermore, the probe 312 may include the monitoring light source or sources themselves if, for example, the monitoring light source is provided in the form of an LED or other construction capable of being contained on the distal end of a probe 312.

The depicted illustrative embodiment of probe 312 also includes visible light collectors 332 configured to detect the monitoring light reflected by polymerizable material as described herein. The visible light collectors 332 may be optically coupled to one or more visible light detectors which may be located in, for example, a housing to which the probe 312 is attached. The visible light collectors 332 may take a variety of different forms as described herein such as, e.g., fiber-optic cables, light guides, etc. Further, the number of visible light collectors 332 used in systems as described herein may vary from as few as one collector to any selected number of collectors suitable to collect and transmit monitoring light reflected from the polymerizable material in systems and methods as described herein.

Figure 8:
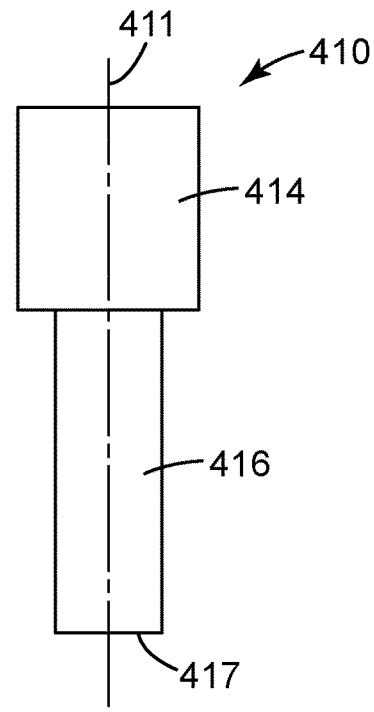
FIG. 8 depicts another illustrative embodiment of a cure monitoring system as described herein including a mixing rod configured to deliver both curing electromagnetic radiation and visible monitoring light to polymerizable material and for returning reflected monitoring light to a detector.
Figure 9:
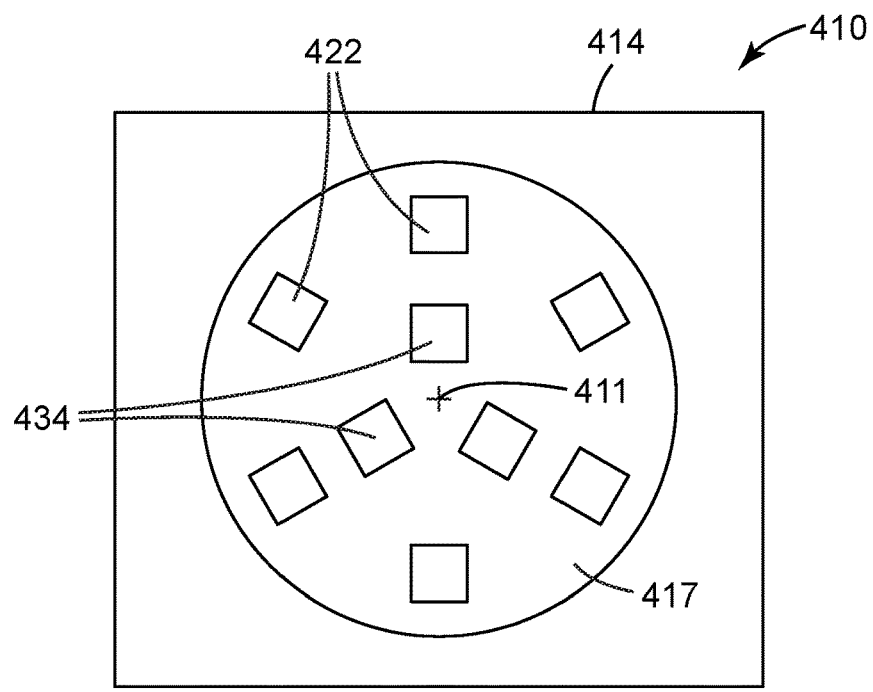
FIG. 9 depicts one illustrative arrangement of curing electromagnetic radiation sources and visible monitoring light sources in the cure monitoring system of FIG. 8.

Another illustrative embodiment of a cure monitoring system as described herein is depicted in connection with FIGS. 8 and 9. The cure monitoring system 410 as seen in FIG. 8 includes a housing 414 and a mixing rod 416. In one or more embodiments, the mixing rod 416 is configured to mix and deliver electromagnetic radiation emitted by one or more curing electromagnetic radiation sources and visible light emitted by one or more visible monitoring light sources, with the curing electromagnetic radiation sources and the visible monitoring light sources located in the housing 414. In one or more embodiments, the mixing rod 416 may be optically coupled to the curing electromagnetic radiation source and the monitoring light source in the housing 414 such that the curing electromagnetic radiation and the monitoring light pass through the mixing rod 416 before reaching polymerizable material. In one or more embodiments, the visible light detector in the housing 414 is also optically coupled to the mixing rod 416 such that reflected monitoring light passes through the mixing rod 416 before reaching the visible light detector in the housing 414.

In one or more embodiments, the mixing rod 416 may be constructed of any suitable optically transmissive material such as, e.g., glass, polymers (e.g., polycarbonate, etc.), etc. Furthermore, curing electromagnetic radiation and visible monitoring light may travel through the mixing rod 416 along the direction of propagation axis 411 and exit the mixing rod 416 at an end face 417.

One potential benefit of a system using a mixing rod to deliver both curing electromagnetic radiation as well as visible monitoring light is that it may be possible to deliver the monitoring light in a manner such that the monitoring light and the curing electromagnetic radiation occupy the same area on a surface on which they are directed, e.g., polymerizable material. In such an instance, the areas occupied by the curing electromagnetic radiation and the monitoring light may be similar to those seen in, e.g., FIG. 3 (described above).

The cure monitoring system 410 of FIG. 8 is seen in a view taken along the propagation axis 411 in FIG. 9. In that view, the curing electromagnetic radiation sources 422 along with the visible monitoring light sources 434 are seen through the end face 417 of mixing rod 416. Both of the curing electromagnetic radiation sources 422 and the visible monitoring light sources 434 may, in the depicted embodiment, be in the form of LEDs. In particular, one or more of the visible monitoring light sources 434 may be LEDs that are driven in a pulsed mode. As a result, one or more of the pulsed mode LEDs serving as visible monitoring light sources 434 may also function as visible light detectors to detect monitoring light reflected by polymerizable material as discussed herein. In one or more embodiments, the curing electromagnetic radiation sources 422 and visible monitoring light sources 434 may be pulsed such that curing electromagnetic radiation is emitted by the curing electromagnetic radiation sources 422 while the monitoring light sources 434 do not emit visible monitoring light to reduce potential interference between the curing electromagnetic radiation sources and the monitoring light sources and the light detector 414.

Illustrative Embodiments

The systems and methods described herein may be described in one or more of the following illustrative, non-limiting embodiments.

Embodiment 1

A system for monitoring a degree of curing of a polymerizable material, the system comprising:

a monitoring light source that emits visible monitoring light at one or more wavelengths in a range from 400 nm to 800 nm, the monitoring light having a wavelength of maximum emission ($\lambda_{max\text{-}mon}$) that does not effectively induce polymerization of the polymerizable material;

a visible light detector configured to detect the monitoring light at one or more wavelengths in a range from 400 nm to 800 nm after the monitoring light is diffusely reflected by the polymerizable material; and a controller operably coupled to the visible light detector, wherein the controller is configured to determine when the polymerizable material reaches a selected degree of curing based at least in part on a selected rate of change in intensity of the diffusely reflected monitoring light detected by the visible light detector.

Embodiment 2

A system according to embodiment 1, wherein the system further comprises a curing electromagnetic radiation source configured to emit curing electromagnetic radiation having a curing wavelength of maximum emission ($\lambda_{max\text{-}cure}$) at which curing of the polymerizable material is induced.

Embodiment 3

A system according to embodiment 2, wherein the controller is operably connected to the curing electromagnetic radiation source, and wherein the controller is configured to stop the curing electromagnetic radiation source from emitting the curing electromagnetic radiation after determining that the polymerizable material has reached the selected degree of curing.

Embodiment 4

A system according to any one of embodiments 2 to 3, wherein the monitoring wavelength of maximum emission ($\lambda_{max\text{-}mon}$) is at least 50 nm different from the curing wavelength of maximum emission ($\lambda_{max\text{-}cure}$) of the curing electromagnetic radiation emitted by the curing electromagnetic radiation source.

Embodiment 5

A system according to any one of embodiments 2 to 4, wherein the monitoring wavelength of maximum emission ($\lambda_{max\text{-}mon}$) is at least 100 nm different from the curing wavelength of maximum emission ($\lambda_{max\text{-}cure}$) of the curing electromagnetic radiation emitted by the curing electromagnetic radiation source.

Embodiment 6

A system according to any one of embodiments 2 to 5, wherein the curing electromagnetic radiation comprises visible light at one or more wavelengths in a range from 400 nm to 800 nm.

Embodiment 7

A system according to any one of embodiments 2 to 6, wherein the curing electromagnetic radiation comprises visible light at one or more wavelengths in a range from 400 nm to 500 nm.

Embodiment 8

A system according to any one of embodiments 2 to 5, wherein the curing electromagnetic radiation comprises electromagnetic radiation in at least one of the infrared spectrum and the ultraviolet spectrum.

Embodiment 9

A system according to any one of embodiments 1 to 8, wherein the visible monitoring light comprises visible light at one or more wavelengths in a range from 500 nm to 700 nm.

Embodiment 10

A system according to any one of embodiments 2 to 9, wherein the curing electromagnetic radiation defines a curing wavelength half-max range having a full width at half maximum emission of the curing electromagnetic radiation of 100 nm or less.

Embodiment 11

A system according to any one of embodiments 1 to 10, wherein the monitoring light defines a monitoring wavelength half-max range having a full width at half maximum emission of the monitoring light of 100 nm or less.

Embodiment 12

A system according to any one of embodiments 2 to 11, wherein the monitoring light emitted by the monitoring light source has, at the curing wavelength of maximum emission ($\lambda_{max\text{-}cure}$), an intensity of 0.1 or less of an intensity of the curing electromagnetic radiation emitted by the curing electromagnetic radiation source at the curing wavelength of maximum emission ($\lambda_{max\text{-}cure}$).

Embodiment 13

A system according to any one of embodiments 2 to 11, wherein the monitoring light source does not emit electromagnetic radiation at the curing wavelength of maximum emission ($\lambda_{max\text{-}cure}$).

Embodiment 14

A system according to any one of embodiments 2 to 13, wherein the system further comprises a filter that transmits light having the monitoring wavelength of maximum emission ($\lambda_{max\text{-}mon}$) and does not transmit electromagnetic radiation having the curing wavelength of maximum emission ($\lambda_{max\text{-}cure}$), and wherein light and electromagnetic radiation directed at the visible light detector is incident on the filter before reaching the visible light detector.

Embodiment 15

A system according to any one of embodiments 1 to 14, wherein the system comprises a filter configured to allow only electromagnetic radiation that does not effectively induce polymerization of the polymerizable material from reaching the visible light detector.

Embodiment 16

A system according to any one of embodiments 2 to 15, wherein the visible light detector does not detect electromagnetic radiation having the curing wavelength of maximum emission ($\lambda_{max\text{-}cure}$).

Embodiment 17

A system according to any one of embodiments 2 to 16, wherein the curing electromagnetic radiation source and the monitoring light source are coaxial.

Embodiment 18

A system according to any one of embodiments 1 to 17, wherein the monitoring light source emits monitoring light having an intensity such that the monitoring light is visible to the naked human eye after passing through the polymerizable material.

Embodiment 19

A system according to any one of embodiments 2 to 18, wherein the system comprises a mixing rod optically coupled to the curing electromagnetic radiation source and the monitoring light source, wherein the curing electromagnetic radiation and the monitoring light pass through the mixing rod before reaching the polymerizable material.

Embodiment 20

A system according to embodiment 19, wherein the visible light detector is optically coupled to the mixing rod, wherein the reflected monitoring light passes through the mixing rod before reaching the visible light detector.

Embodiment 21

A system according to any one of embodiments 1 to 20, wherein the system further comprises a feedback generator operably coupled to the controller, wherein the controller is configured to cause the feedback generator to provide sensory feedback to a user after determining that the polymerizable material has reached the selected degree of curing.

Embodiment 22

A system according to embodiment 21, wherein the feedback generator comprises one or both of a visual indicator and an audible/tactile indicator.

Embodiment 23

A system according to any one of embodiments 1 to 22, wherein the system comprises a hand-held device comprising a probe configured for insertion into the mouth of a human, and wherein the visible monitoring light is emitted from the probe, and further wherein monitoring light detected by the visible light detector is incident on the probe before reaching the visible light detector.

Embodiment 24

A system according to any one of embodiments 2 to 22, wherein the system comprises a hand-held device comprising a probe configured for insertion into the mouth of a human, and wherein the visible monitoring light and the curing electromagnetic radiation are emitted from the probe, and further wherein monitoring light detected by the visible light detector is incident on the probe before reaching the visible light detector.

Embodiment 25

A method of monitoring a degree of cure of a polymerizable material, the method comprising:
irradiating the polymerizable material with visible monitoring light at one or more wavelengths in a range from 400 nm to 800 nm, the monitoring light having a monitoring wavelength of maximum emission ($\lambda_{max\text{-}mon}$) that does not effectively induce polymerization of the polymerizable material;
detecting the monitoring light after it has been diffusely reflected by the polymerizable material at one or more wavelengths in a range from 400 nm to 800 nm; and
determining when the polymerizable material reaches a selected degree of curing based at least in part on a selected rate of change in intensity of the detected diffusely reflected monitoring light.

Embodiment 26

A method according to embodiment 25, wherein the method further comprises irradiating the polymerizable material with curing electromagnetic radiation, wherein the curing electromagnetic radiation has a curing wavelength of maximum emission ($\lambda_{max\text{-}cure}$) at which curing of the polymerizable material is induced.

Embodiment 27

A method according to embodiment 26, wherein the method further comprises stopping the irradiation of polymerizable material with the curing electromagnetic radiation after determining that the polymerizable material has reached the selected degree of curing.

Embodiment 28

A method according to any one of embodiments 26 to 27, wherein the method further comprises:
detecting the diffusely reflected monitoring light using a visible light detector; and
stopping the irradiation of polymerizable material with the curing electromagnetic radiation based at least in part on an output from the visible light detector.

Embodiment 29

A method according to embodiment 28, wherein the output from the visible light detector is based at least in part on the selected rate of change in intensity of the diffusely reflected monitoring light as detected by the visible light detector.

Embodiment 30

A method according to any one of embodiments 25 to 29, wherein the method further comprises providing sensory feedback to a user indicating that the polymerizable material has reached the selected degree of curing after determining that the polymerizable material has reached the selected degree of curing.

Embodiment 31

A method according to embodiment 30, wherein the sensory feedback comprises one or more of audible feedback, visual feedback, and tactile feedback.

Embodiment 32

A method according to any one of embodiments 26 to 31, wherein the monitoring wavelength of maximum emission ($\lambda_{max\text{-}mon}$) is at least 50 nm different from the curing wavelength of maximum emission ($\lambda_{max\text{-}cure}$) of the curing electromagnetic radiation.

Embodiment 33

A method according to any one of embodiments 26 to 31, wherein the monitoring wavelength of maximum emission ($\lambda_{max\text{-}mon}$) is at least 100 nm different from the curing wavelength of maximum emission ($\lambda_{max\text{-}cure}$) of the curing electromagnetic radiation.

Embodiment 34

A method according to any one of embodiments 26 to 33, wherein the curing electromagnetic radiation comprises visible light at one or more wavelengths in a range from 400 nm to 800 nm.

Embodiment 35

A method according to any one of embodiments 26 to 34, wherein the curing electromagnetic radiation comprises visible light at one or more wavelengths in a range from 400 nm to 500 nm.

Embodiment 36

A method according to any one of embodiments 26 to 33, wherein the curing electromagnetic radiation comprises electromagnetic radiation in at least one of the infrared spectrum and the ultraviolet spectrum.

Embodiment 37

A method according to any one of embodiments 25 to 36, wherein the visible monitoring light comprises visible light at one or more wavelengths in a range from 500 nm to 700 nm.

Embodiment 38

A method according to any one of embodiments 26 to 37, wherein the curing electromagnetic radiation has a full width at half maximum emission of 100 nm or less.

Embodiment 39

A method according to any one of embodiments 25 to 38, wherein the monitoring light has a full width at half maximum emission of 100 nm or less.

Embodiment 40

A method according to any one of embodiments 26 to 39, wherein the curing electromagnetic radiation and the monitoring light irradiating the polymerizable material are coaxial.

Embodiment 41

A method according to any one of embodiments 26 to 40, wherein the monitoring light irradiates a smaller area of a surface of the polymerizable material than the curing electromagnetic radiation.

Embodiment 42

A method according to any one of embodiments 26 to 40, wherein a monitoring area on a surface of the polymerizable material irradiated by the monitoring light and a curing area on the surface of the polymerizable material irradiated by the curing electromagnetic radiation are the same.

Embodiment 43

A method according to any one of embodiments 26 to 42, wherein the visible monitoring light irradiating the polymerizable dental material has an intensity, at the curing wavelength of maximum emission ($\lambda_{max\text{-}cure}$), of 0.1 or less of an intensity of the curing electromagnetic radiation at the curing wavelength of maximum emission ($\lambda_{max\text{-}cure}$).

Embodiment 44

A method according to any one of embodiments 26 to 42, wherein the monitoring light does not include light at the curing wavelength of maximum emission ($\lambda_{max\text{-}cure}$).

Embodiment 45

A method according to any one of embodiments 26 to 44, wherein the method further comprises filtering light reaching a visible light detector detecting the monitoring light after it has been diffusely reflected by the polymerizable material such that electromagnetic radiation having the curing wavelength of maximum emission ($\lambda_{max\text{-}cure}$) does not reach the visible light detector.

Embodiment 46

A method according to any one of embodiments 26 to 45, wherein the method further comprises detecting the monitoring light after it has been diffusely reflected by the polymerizable material using a visible light detector that does not detect electromagnetic radiation having the curing wavelength of maximum emission ($\lambda_{max\text{-}cure}$).

Embodiment 47

A method according to any one of embodiments 25 to 46, wherein the monitoring light penetrates through an entire thickness of the polymerizable material.

Embodiment 48

A method according to embodiment 47, wherein the monitoring light is visible to the naked human eye after passing through the polymerizable material.

Embodiment 49

A method according to any one of embodiments 47 to 48, wherein the monitoring light passes through at least 4 mm of the polymerizable material.

Embodiment 50

A method according to any one of embodiments 47 to 49, wherein the monitoring light passes through no more than 10 mm of the polymerizable material.

Embodiment 51

A method according to any one of embodiments 25 to 50, wherein the visible monitoring light is emitted from a probe inserted into an oral cavity of a human, and further wherein monitoring light detected by the visible light detector is incident on the probe before reaching the visible light detector.

Embodiment 52

A method according to any one of embodiments 26 to 50, wherein the visible monitoring light and the curing electromagnetic radiation are emitted from a probe inserted into an oral cavity of a human, and further wherein monitoring light detected by the visible light detector is incident on the probe before reaching the visible light detector.

Embodiment 53

A method according to any one of embodiments 25 to 52, wherein the polymerizable material is a dental material.

Embodiment 54

A method according to any one of embodiments 25 to 53, wherein the polymerizable material comprises at least one selected from the group of photoinitiators, thermal initiators, chemical initiators, and catalysts

Embodiment 55

A method according to any one of embodiments 25 to 54, wherein the polymerizable material comprises a filler.

Embodiment 56

A method according to any one of embodiments 25 to 55, wherein the polymerizable material comprises a polymerizable chemical moiety, and wherein the polymerizable chemical moiety does not absorb the monitoring light.

EXAMPLES

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the present invention and/or the scope of the appended claims.

Figure 10:
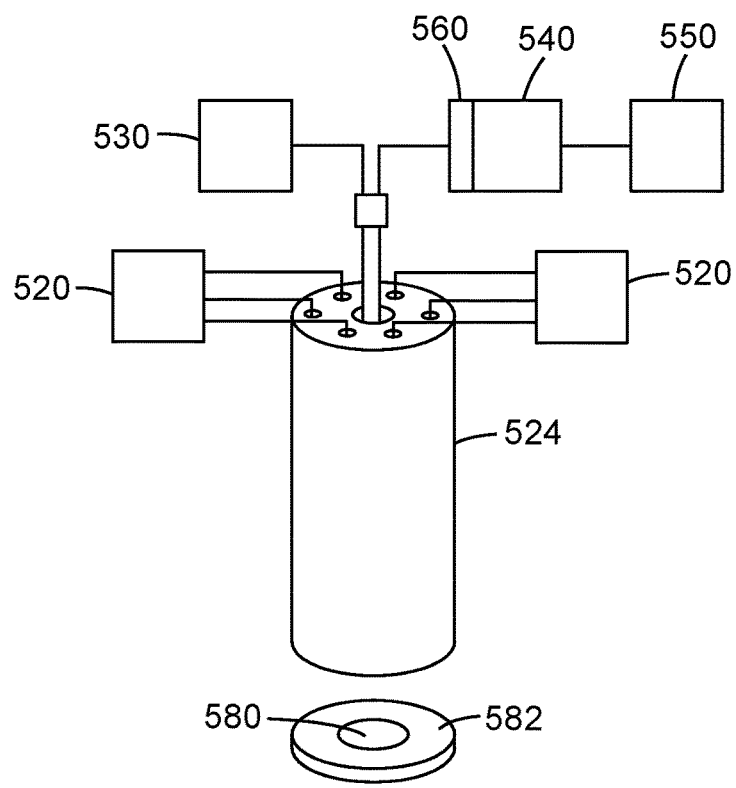
FIG. 10 depicts a cure monitoring system as used in Examples 1-4 and the Comparative Example.

Cure Monitoring System:

FIG. 10 depicts the cure monitoring system used to collect the data discussed below. Unless otherwise specified, a disc-shaped sample 580 of a selected polymerizable material was contained in a black washer 582 used as a mold. The top and bottom of the sample 580 were pressed flat.

The sample 580 was placed approximately 1 mm below a reflection probe 526 (Avantes, Apeldoorn, Netherlands, FCR-7UVIR200-2-1.5X100). The reflection probe 526 contained six (6) light fibers optically coupled to a variety of different monitoring light sources 530 in the form of LEDs emitting monitoring light of different wavelengths as discussed in each of the examples. In each example, the monitoring LEDs were driven by a ThorLabs M4100 LED Driver (ThorLabs, Newton, N.J., USA).

The central read optical fiber of the reflection probe 526 was used to collect and deliver reflected monitoring light to a light detector 540 (Optoelectronics, Hawthorne, Calif., USA, PIN10DP). The reflected monitoring passed through a bandpass filter 560 appropriate for the monitoring wavelength in each example as discussed below (before reaching the light detector). The signal from the light detector was amplified (Stanford Research Systems, Sunnyvale, Calif., USA, SR570 Amplifier) and sent to a data acquisition computer 550. In each example, data from the light detector 540 was acquired at a rate of ten (10) samples per second and all data was normalized by dividing data points by the maximum mV reading.

The reflection probe 526 was located in a central bore of an acrylic light guide to which six 450 nm blue light emitting diodes 520 (LXZ1-PR01 Lumileds, San Jose, Calif., USA, LED—450 mA applied) were optically coupled to deliver curing light to the sample 580 through the light guide 524 surrounding the reflection probe 526. It should be noted that curing "light" is used in the examples because the wavelength at which curing of the polymerizable material used in the examples is in the visible range of the electromagnetic radiation spectrum.

Cure Definition:

The degree of curing of the samples was defined using the bottom to top (B/T) ratio of Barcol Hardness. The bottom Barcol Hardness was measured at the surface of the sample 580 that faced away from the reflection probe 526 and light guide 524. The top Barcol Hardness was measured at the surface of the sample 580 that faced the reflection probe 526 and light guide 524.

Barcol Hardness was determined according to the following procedure. After irradiation with curing light as discussed in each example, the hardness of the sample at both the top and the bottom of the mold was measured using a Barber-Coleman Impressor (a hand-held portable hardness tester; Model GYZJ 934-1; Barber-Coleman Company, Industrial Instruments Division, Lovas Park, Ind., USA) equipped with an indenter. Top and bottom Barcol Hardness values were measured within 1 minute of the termination of cure light exposure. The bottom to top ratios (B/T) were calculated (after at least some curing of the sample—noting that the B/T ratio before any curing would be the same as after complete curing) using, for a given cure light exposure time, the Bottom Hardness values divided by the arithmetic mean of all Top Hardness values at that cure light exposure time as set forth in the following equation:

(Bottom Hardness Value)/(Arithmetic Mean of Top Hardness Values)×100=B/T ratio

A sample of polymerizable material in the examples was deemed adequately cured when the B/T ratio reached 0.8 or above for a given exposure time.

Example 1—Red 625 nm Monitoring Light

A sample of a polymerizable material in the form of Filtek Supreme Ultra shade A2B (3M Oral Care, St. Paul, Minn., USA) was contained in a black washer (McMaster-Carr, Elmhurst, Ill., USA, part#98029A029) used as a mold to provide a disc-shaped sample that was 3 mm thick and 7 mm in diameter. The sample and washer were placed on a black piece of plastic. Initially, the cure light (450 nm) exposure time was set to 1 second. After exposure to the cure light, the top and bottom Barcol Hardness was collected for each sample. This procedure was repeated for subsequent time points, preparing a new sample for each exposure time.

In this example, the monitoring light source 530 was a 625 nm red LED (ThorLabs, part# M625F1). The bandpass filter 560 used in connection with the light detector 540 was a 630 nm bandpass filter (ThorLabs, part# FB630-10). The 625 nm red LED monitoring light was turned on for approximately 5 seconds before the curing light LEDs were turned on to establish a baseline for the light detector. The sample was then exposed to the 450 nm blue curing light for 15 seconds while the monitoring light LED was simultaneously used to monitor cure. After 15 seconds the curing light was turned off, and approximately 5 seconds of continued exposure with the monitoring light was collected to establish a post-cure baseline. The data was collected as a millivolt (mV) signal from the photodetector 540. Data was normalized to the maximum mV reading and reported as normalized reflectance.

The results are outlined in Table 1. Each time point was replicated multiple times. The bottom to top ratio was calculated as described above. Table 1 is a compilation of the average B/T ratio and the standard deviation of the data points collected at each time point. Exposure times of 4 seconds or longer were adequately cured as defined above (i.e., such samples had a B/T ratio of 0.8 or higher).

TABLE 1

B/T Ratio as a Function of Time

| Exposure Time (s) | B/T Mean | tDev |
|---|---|---|
| 1 | 0% | .0% |
| 2 | 60% | .8% |
| 2.5 | 52% | .6% |
| 3 | 70% | .7% |
| 3.5 | 79% | .5% |
| 4 | 86% | .0% |
| 5 | 90% | .3% |
| 5.5 | 89% | .7% |
| 10 | 93% | .6% |
| 15 | 96% | .9% |
| 20 | 100% | .2% |

Figure 11:
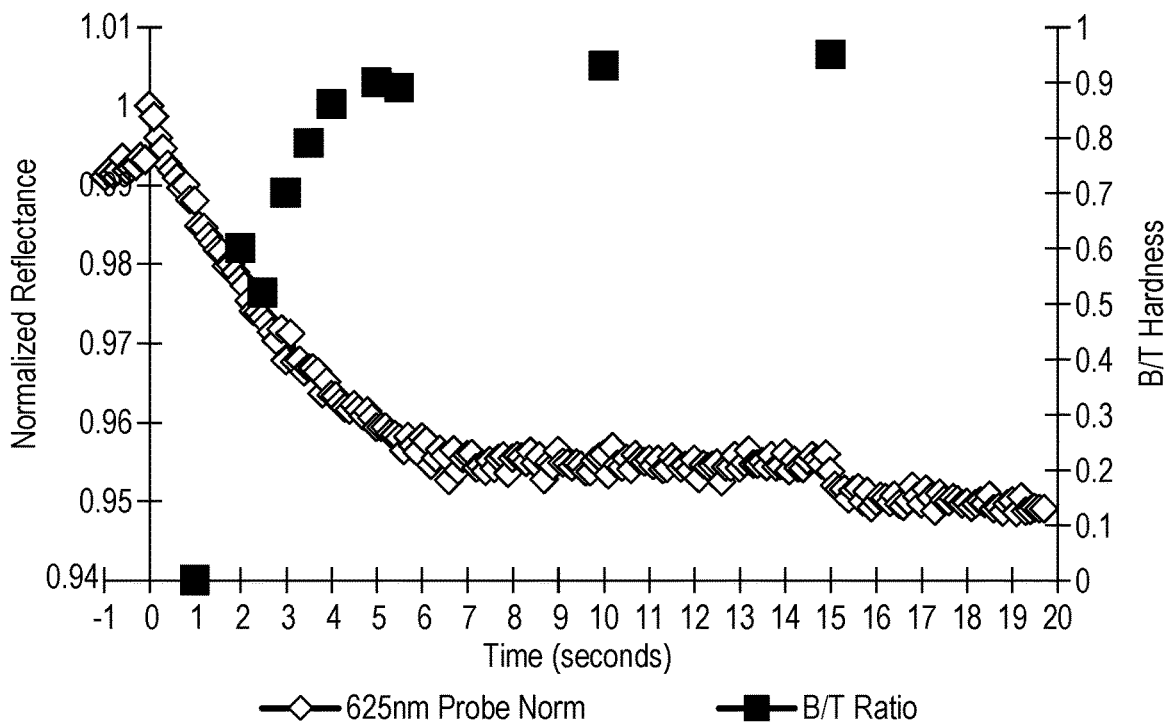
FIG. 11 is a plot of reflectance of the monitoring light measured by the light detector and B/T hardness data of Table 1 as discussed in Example 1.

The graph of FIG. 11 is a plot of reflectance of the monitoring light measured by the light detector (with the 5 seconds of reflectance data collected before curing light exposure was truncated to one second). Overlaid on this graph is the B/T hardness data of Table 1. The graph of FIG. 11 demonstrates that the B/T hardness slows and/or stops changing at about 4 seconds (at the point of adequate curing) which correlates with the time that the change in reflectance of the monitoring light slows and/or stops.

Figure 12:
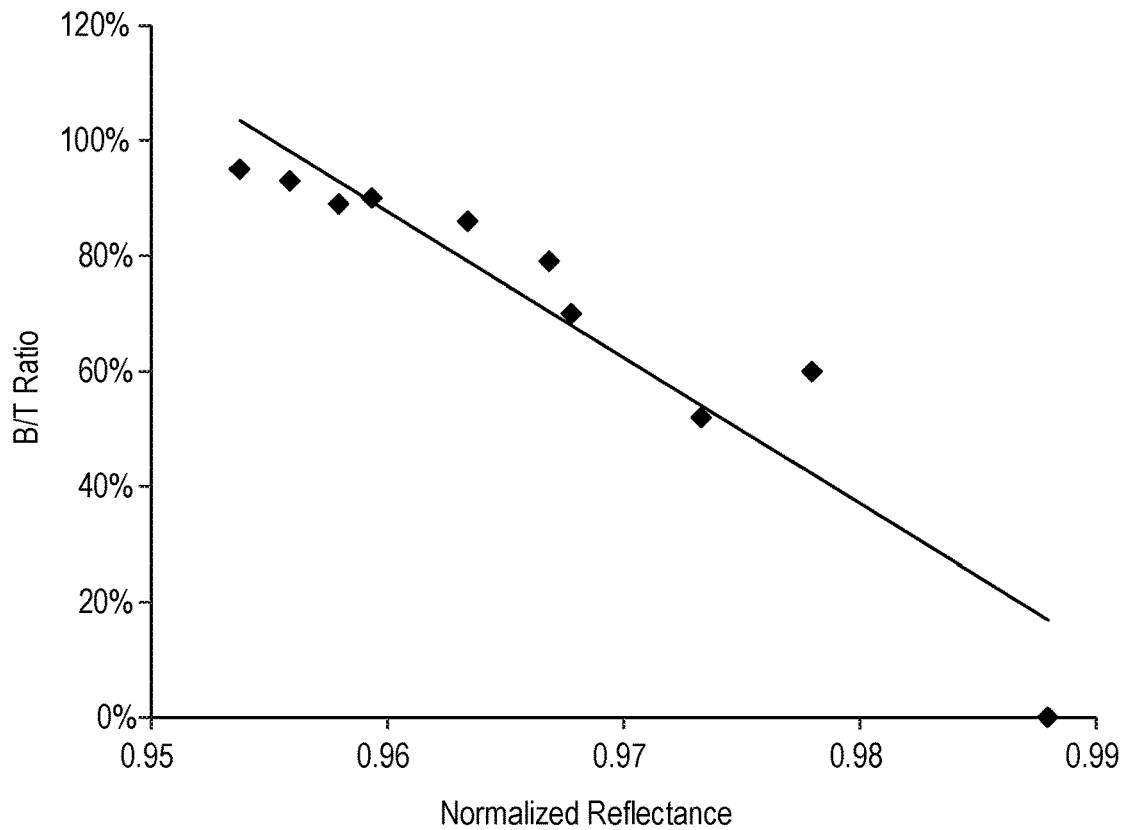
FIG. 12 is a plot of the B/T ratio versus normalized reflectance for Example 1.

FIG. 12 is a plot of B/T ratio of this example versus the normalized reflectance. A linear relationship demonstrates a correlation between B/T ratio and reflectance of the monitoring light as detected by the light detector which is confirmed by a simple linear regression line drawn through the points with a resulting R-squared value of 0.9—demonstrating a predictive correlation between reflected monitoring light and adequate curing of the sample.

Example 2—Green 530 nm Monitoring Light

The same process, apparatus, and materials used in Example 1 were used in Example 2, except that a 530 nm monitoring light LED (ThorLabs M530F1) was used in place of the 625 nm monitoring light LED of Example 1. In addition, the bandpass filter used with the light detector was changed to a 530 nm bandpass filter (Thorlabs FB530-10 bandpass).

Figure 13:
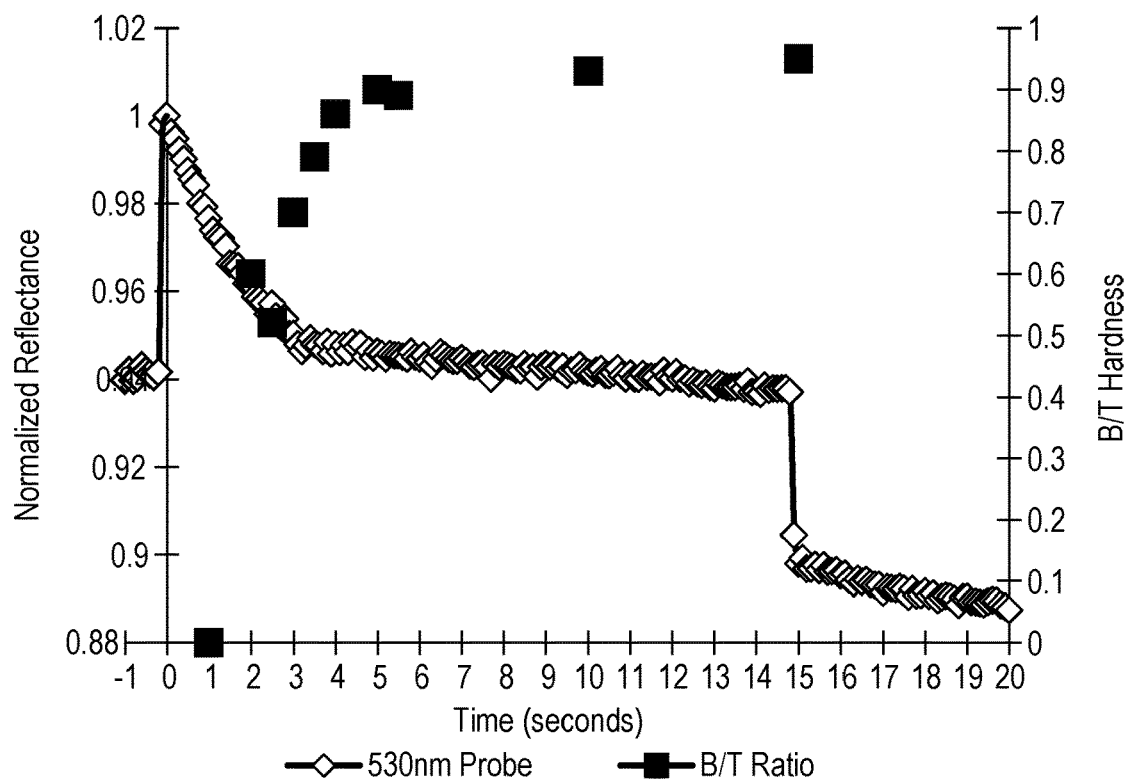
FIG. 13 is a plot of reflectance of the monitoring light measured by the light detector and B/T hardness data for Example 2.

The graph of FIG. 13 is a plot of reflectance of the monitoring light measured by the light detector (with the 5 seconds of reflectance data collected before curing light exposure truncated to one second). Overlaid on this graph is the B/T hardness data collected for Example 2. The graph of FIG. 13 demonstrates that the B/T hardness slows and/or stops changing at about 4 seconds (at the point of adequate curing) which correlates with the time that the change in reflectance of the monitoring light slows and/or stops.

Figure 14:
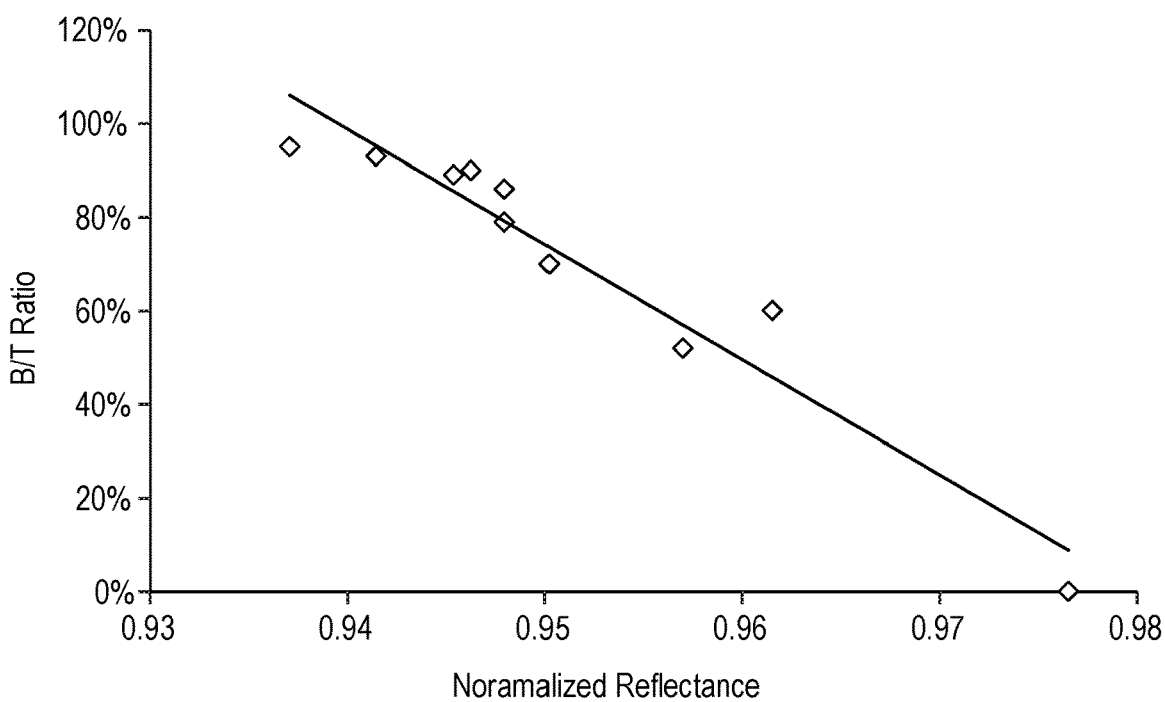
FIG. 14 is a plot of the B/T ratio versus normalized reflectance for Example 2.

FIG. 14 is a plot of B/T ratio of this example versus the normalized reflectance. A linear relationship demonstrates a correlation between B/T ratio and reflectance of the monitoring light as detected by the light detector which is confirmed by a simple linear regression line drawn through the points with a resulting R-squared value of 0.9—again demonstrating a predictive correlation between reflected monitoring light and adequate curing of the sample.

Example 3—Red 740 nm Monitoring Light

The same process, apparatus, and materials used in Example 1 were used in Example 2, except that a 740 nm monitoring light LED (ThorLabs M740F1) was used in place of the 625 nm monitoring light LED of Example 1. In addition, the bandpass filter used with the light detector was changed to a 740 nm bandpass filter (Thorlabs FB740-10 bandpass).

Figure 15:
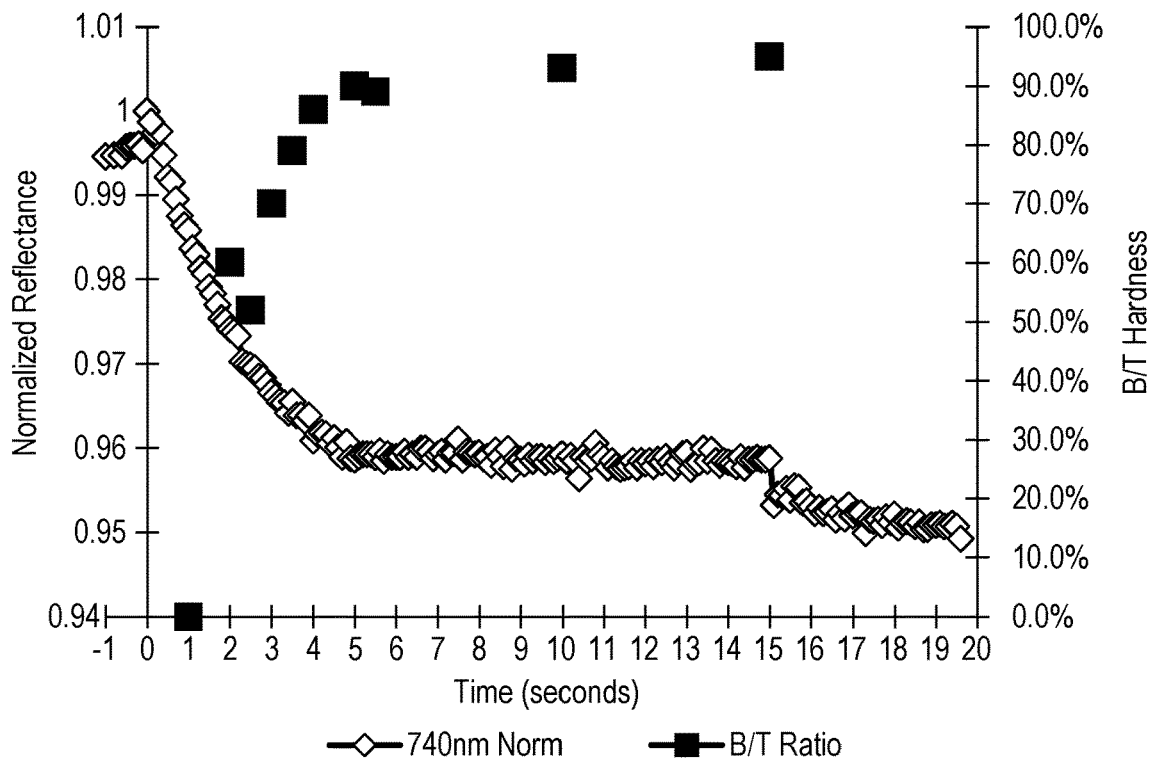
FIG. 15 is a plot of reflectance of the monitoring light measured by the light detector and B/T hardness data for Example 3.

The graph of FIG. 15 is a plot of reflectance of the monitoring light measured by the light detector (with the 5 seconds of reflectance data collected before curing light exposure truncated to one second). Overlaid on this graph is the B/T hardness data collected for Example 3. The graph of FIG. 15 demonstrates that the B/T hardness slows and/or stops changing at about 4 seconds (at the point of adequate curing) which correlates with the time that the change in reflectance of the monitoring light slows and/or stops.

Figure 16:
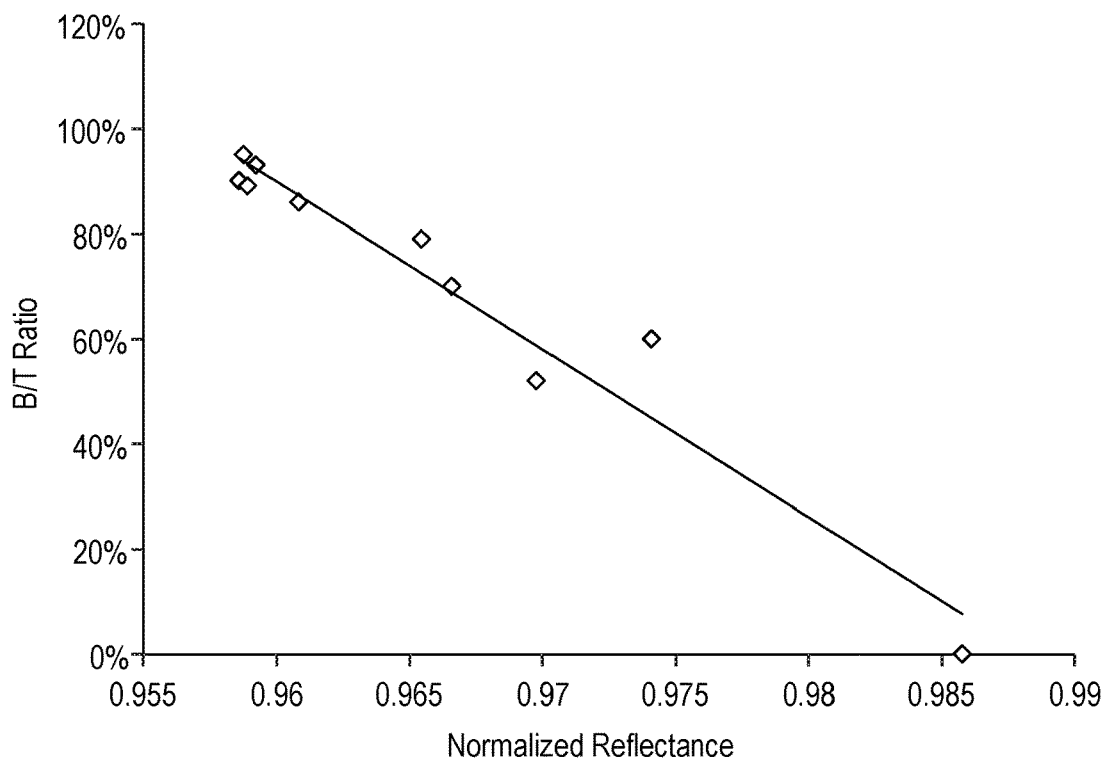
FIG. 16 is a plot of the B/T ratio versus normalized reflectance for Example 3.

FIG. 16 is a plot of B/T ratio of this example versus the normalized reflectance. A linear relationship demonstrates a correlation between B/T ratio and reflectance of the monitoring light as detected by the light detector which is confirmed by a simple linear regression line drawn through the points with a resulting R-squared value of 0.9—again demonstrating a predictive correlation between reflected monitoring light and adequate curing of the sample.

Example 4—Depth of Monitoring Light Penetration

The apparatus described in FIG. 10 was used with the 740 nm red monitoring LED and 740 nm bandpass filter of Example 3. A 5 mm thick sample of polymerizable material in the form of Filtek Bulk Fill Posterior A2 shade (3M Oral Care, St. Paul, Minn., USA) was prepared in a black washer (McMaster-Carr, Elmhurst, Ill., USA, part#98099A029) as in Examples 1-3, except that the thickness of the sample was 5 mm. The sample and washer were placed on a white piece of plastic under the monitoring light, which was turned on for approximately 5 seconds to establish a baseline reading of reflectance from the light detector. The sample was then exposed to a 450 nm blue curing light as in Examples 1-3 for various times to cure. Simultaneously, the monitoring light (740 nm red) was used to monitor curing of the sample. After the 450 nm blue cure light was turned off, approximately 5 seconds of continued exposure with the monitoring light was used to establish a post cure baseline from the light detector. Triplicate measurements were made of each run, with the data from the three runs averaged.

Table 2 shows bottom to top (B/T) hardness ratios as a function of exposure time. B/T ratios for exposure to curing light for periods of 10 seconds or longer were adequately cured (i.e., had a B/T ratio of 0.8 or greater).

TABLE 2

| B/T Ratio at Given Exposure Time | | | |
| --- | --- | --- | --- |
| Exposure Time (s) | B/T Mean | StDev | N |
| 6 | 57.8% | 10.7% | 3 |
| 10 | 80.8% | 1.5% | 3 |
| 16 | 88.8% | 1.5% | 3 |
| 20 | 90.1% | 3.6% | 3 |
| 30 | 94.3% | 0.0% | 3 |

Figure 17:
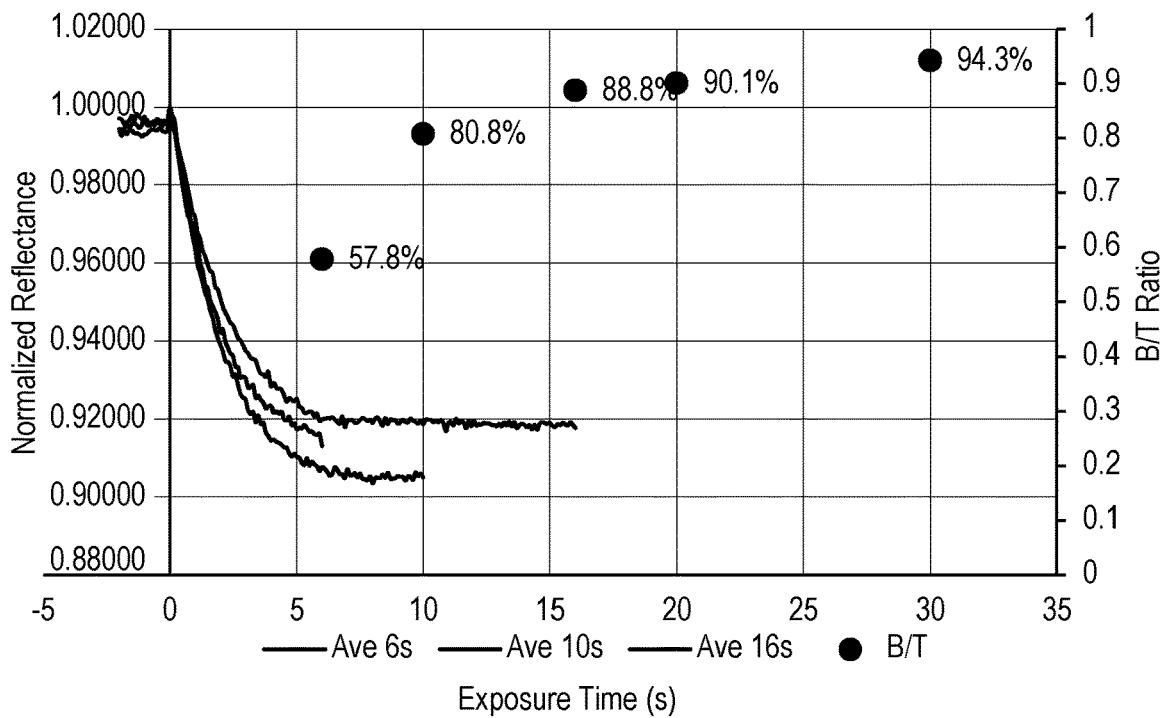
FIG. 17 depicts normalized monitoring light reflectance data and B/T hardness data collected in Example 4.

The graph depicted in FIG. 17 shows normalized reflectance data of the sample of Example 4 after exposure to the curing light for 6, 10 and 16 seconds. The 5 seconds of pre-cure baseline data was truncated to 1 second and the post-cure baseline data is not shown. The B/T ratio shows that curing light exposure times of 10 seconds and longer yielded an adequately cured 5 mm thick sample. The reflectance curves each reach a steady state at the same time the sample is adequately cured as determined by the B/T hardness ratios.

Comparatively, the B/T ratio data collected for a curing light exposure of only 6 seconds shows that the sample has not adequately cured and this correlates with the failure of the reflectance curve to reach a steady state as seen in the graph of FIG. 17.

This data also demonstrates that the monitoring light is extending through the 5 mm thickness of the sample because the B/T ratio and the normalized reflectance are both reaching a steady state indicative of an adequately cured sample.

Example 5—Red 625 nm Monitoring Light
(Two-Part Redox Curable System)

A sample of a two-part redox curable polymerizable material in the form of Concise Composite Universal Shade (a polymerizable dental material from 3M Oral Care, St. Paul, Minn., USA) was thoroughly mixed in equal parts and the resultant mixture contained in a black washer (McMaster-Carr, Elmhurst, Ill., USA, part#98029A029) used as a mold to provide a disc-shaped sample that was 3 mm thick and 7 mm in diameter.

In this example, the monitoring light source 530 was a 625 nm red LED (ThorLabs, part# M625F1) and no curing light was used. The disc-shaped sample was placed under the monitoring light within ten seconds after being formed. The bandpass filter 560 used in connection with the light detector 540 was a 630 nm bandpass filter (ThorLabs, part# FB630-10). The sample data was collected as a millivolt (mV) signal from the photodetector 540. A plot of the reflectance of the monitoring light measured by the light detector as a function of time showed a profile similar to that of FIG. 11 of Example 1, with the rate of change in intensity of the reflected monitoring light detected becoming negligible within 6 minutes. Thus, the curing of a redox curable polymerizable material could also be monitored by detecting changes in intensity of visible monitoring light.

Comparative Example

The same apparatus and sample material as used in Example 1 was used except that no monitoring light was used and no bandpass filter was used to limit the wavelength of light reaching the light detector. As a result, reflected curing light was detected by the light detector during the curing process.

Figure 18:
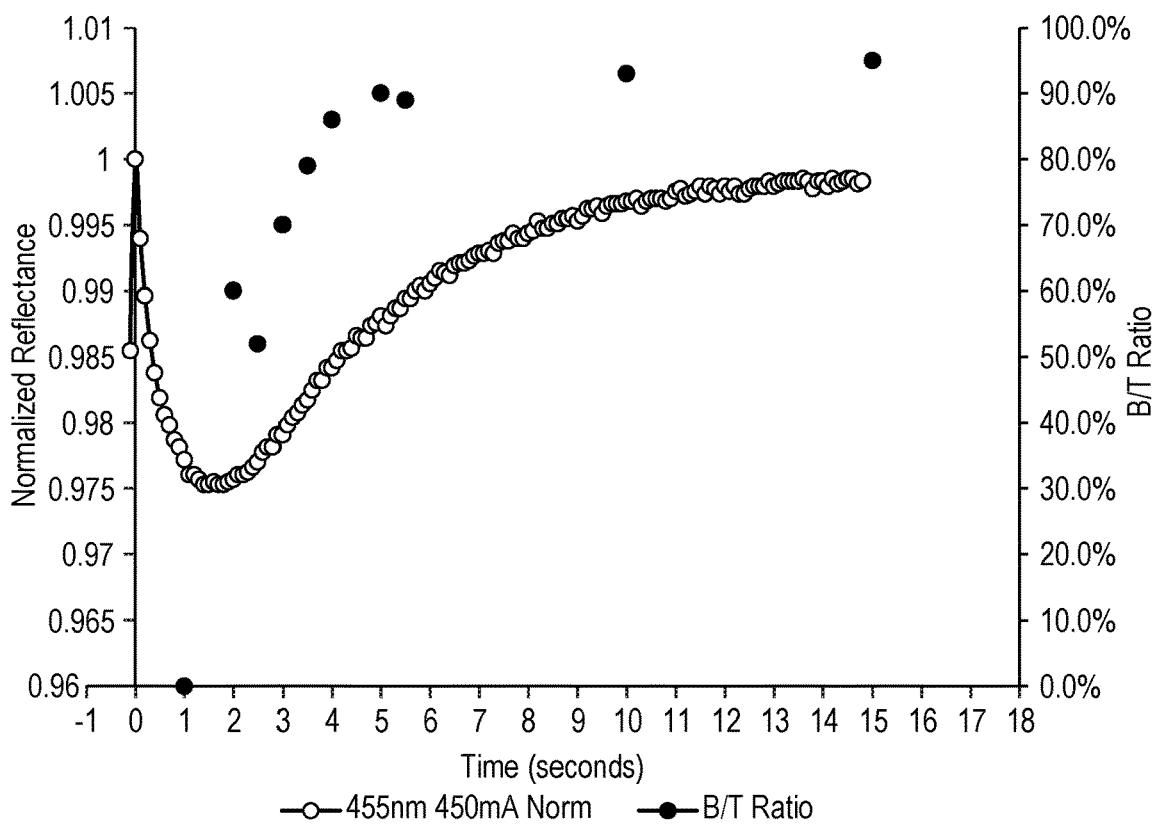
FIG. 18 is a plot of reflectance of blue 450 nm curing electromagnetic radiation measured by the light detector and B/T hardness data as collected in the Comparative Example.

FIG. 18 is a graph depicting reflectance of the blue curing light as detected by the light detector for a 15 second exposure period. This graph demonstrates that the B/T ratio hardness curve stops changing at about 5 seconds (consistent with Example 1), while the reflectance curve continues to change for the remainder of the 15 second period. Unlike Examples 1-3, no distinctive part of the reflectance curve corresponds with a B/T ratio that defines full cure of the sample.

Figure 19:
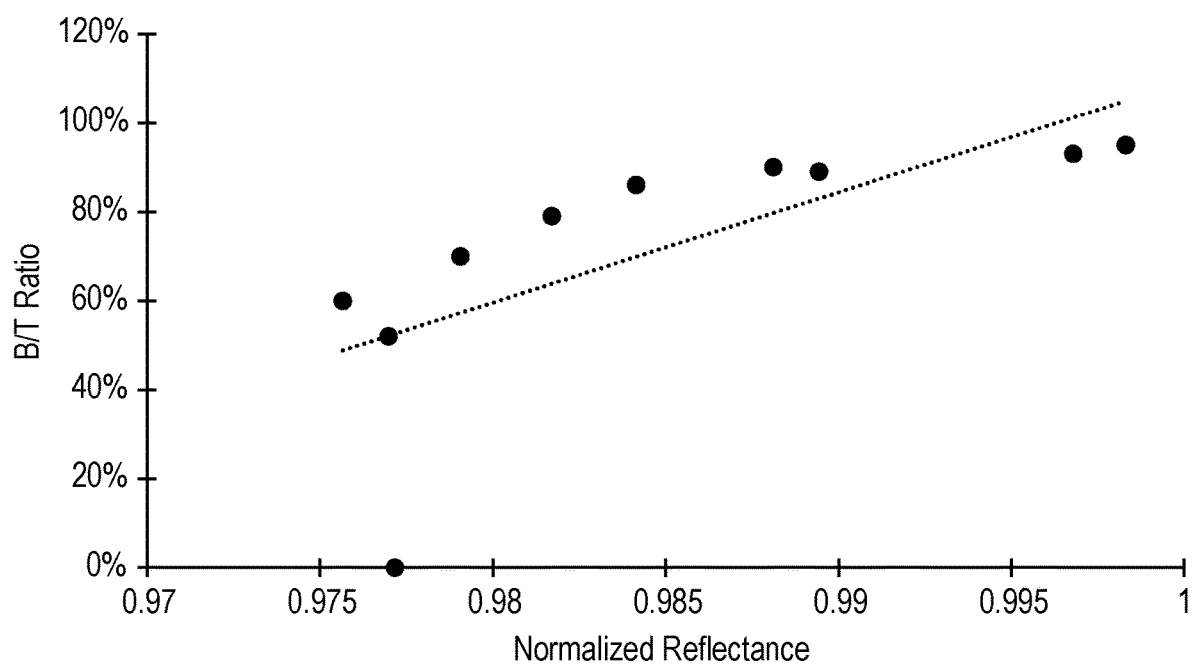
FIG. 19 is a plot of the B/T ratio versus normalized reflectance for the Comparative Example.

FIG. 19 is a plot of the B/T ratio versus normalized reflectance for this comparative example. A simple linear regression drawn through the points and the resulting R-squared value is 0.5—showing a poor correlation between reflected monitoring light and curing of the sample.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a system and/or method that "comprises" a list of elements (e.g., components or features or steps) is not necessarily limited to only those elements (or components or features or steps), but may include other elements (or components or features or steps) not expressly listed or inherent to the system and/or method.

As used herein, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed components or a combination of any two or more of the listed components.

As used herein, the transitional phrases "consists of" and "consisting of" exclude any element, step, or component not specified. For example, "consists of" or "consisting of" used in a preamble of a claim would limit the claim to the components or steps specifically recited in the claim. When the phrase "consists of" or "consisting of" appears in a clause of the body of a claim, rather than immediately following the preamble, the phrase "consists of or" consisting of limits only the components or steps set forth in that clause; other components or steps are not excluded from the claim as a whole.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

From the above disclosure of the general principles of the present invention, the preceding detailed description, and the examples, those skilled in this art will readily comprehend the various modifications, re-arrangements and substitutions to which the present invention is susceptible, as well as the various advantages and benefits the present invention may provide. Therefore, the scope of the invention should be limited only by the following claims and equivalents thereof.

The invention claimed is:

1. A system for monitoring a degree of curing of a polymerizable material, the system comprising:
   a monitoring light source that emits visible monitoring light at one or more wavelengths greater than 550 nm, the monitoring light having a wavelength of maximum emission ($\lambda$max-mon) that does not effectively induce polymerization of the polymerizable material;
   a visible light detector configured to detect the monitoring light at one or more wavelengths in a range from 400 nm to 800 nm after the monitoring light is diffusely reflected by the polymerizable material; and
   a controller operably coupled to the visible light detector, wherein the controller is configured to determine when the polymerizable material reaches a selected degree of curing based at least in part on a selected rate of change in intensity of the diffusely reflected monitoring light detected by the visible light detector.

2. A system according to claim 1, wherein the system further comprises a curing electromagnetic radiation source configured to emit curing electromagnetic radiation having a curing wavelength of maximum emission ($\lambda$max-cure) at which curing of the polymerizable material is induced.

3. A system according to claim 2, wherein the controller is operably connected to the curing electromagnetic radiation source, and wherein the controller is configured to stop the curing electromagnetic radiation source from emitting the curing electromagnetic radiation after determining that the polymerizable material has reached the selected degree of curing.

4. A system according to claim 2, wherein the monitoring wavelength of maximum emission ($\lambda$max-mon) is at least 50 nm different from the curing wavelength of maximum emission ($\lambda$max-cure) of the curing electromagnetic radiation emitted by the curing electromagnetic radiation source.

5. A system according to claim 2, wherein the monitoring wavelength of maximum emission ($\lambda$max-mon) is at least 100 nm different from the curing wavelength of maximum emission ($\lambda$max-cure) of the curing electromagnetic radiation emitted by the curing electromagnetic radiation source.

6. A system according to claim 2, wherein the curing electromagnetic radiation comprises visible light at one or more wavelengths in a range from 400 nm to 800 nm.

7. A system according to claim 2, wherein the curing electromagnetic radiation comprises visible light at one or more wavelengths in a range from 400 nm to 500 nm.

8. A system according to claim 2, wherein the curing electromagnetic radiation comprises electromagnetic radiation in at least one of the infrared spectrum and the ultraviolet spectrum.

9. A system according to claim 1, wherein the visible monitoring light comprises visible light at one or more wavelengths in a range from 500 nm to 700 nm.

10. A system according to claim 2, wherein the curing electromagnetic radiation defines a curing wavelength half-max range having a full width at half maximum emission of the curing electromagnetic radiation of 100 nm or less.

11. A system according to claim 1, wherein the monitoring light defines a monitoring wavelength half-max range having a full width at half maximum emission of the monitoring light of 100 nm or less.

12. A system according to claim 2, wherein the monitoring light emitted by the monitoring light source has, at the curing wavelength of maximum emission ($\lambda$max-cure), an intensity of 0.1 or less of an intensity of the curing electromagnetic radiation emitted by the curing electromagnetic radiation source at the curing wavelength of maximum emission ($\lambda$max-cure).

13. A system according to claim 2, wherein the monitoring light source does not emit electromagnetic radiation at the curing wavelength of maximum emission ($\lambda$max-cure).

14. A system according to claim 2, wherein the system further comprises a filter that transmits light having the monitoring wavelength of maximum emission ($\lambda$max-mon) and does not transmit electromagnetic radiation having the curing wavelength of maximum emission ($\lambda$max-cure), and wherein light and electromagnetic radiation directed at the visible light detector is incident on the filter before reaching the visible light detector.

15. A system according to claim 1, wherein the system comprises a filter configured to allow only electromagnetic radiation that does not effectively induce polymerization of the polymerizable material from reaching the visible light detector.

16. A system according to claim 2, wherein the visible light detector does not detect electromagnetic radiation having the curing wavelength of maximum emission ($\lambda$max-cure).

17. A system according to claim 2, wherein the curing electromagnetic radiation source and the monitoring light source are coaxial.

18. A system according to claim 1, wherein the monitoring light source emits monitoring light having an intensity such that the monitoring light is visible to the naked human eye after passing through the polymerizable material.

19. A system according to claim 2, wherein the system comprises a mixing rod optically coupled to the curing electromagnetic radiation source and the monitoring light source, wherein the curing electromagnetic radiation and the monitoring light pass through the mixing rod before reaching the polymerizable material.

20. A system according to claim 19, wherein the visible light detector is optically coupled to the mixing rod, wherein the reflected monitoring light passes through the mixing rod before reaching the visible light detector.

21. The system of claim 1, further comprising the polymerizable material that comprises yellow and red colored material that absorbs light between 400 and 550 nm.

22. The system of claim 1, wherein the monitoring light passes through at least 4 mm of the polymerizable material.

* * * * *